United States Patent
Nakagata et al.

(10) Patent No.: US 9,094,204 B2
(45) Date of Patent: Jul. 28, 2015

(54) IMAGE ENCRYPTION SYSTEM AND IMAGE DECRYPTION SYSTEM

(71) Applicant: FUJITSU LIMITED, Kawasaki (JP)

(72) Inventors: Shohei Nakagata, Kawasaki (JP); Jun Takahashi, Kawasaki (JP); Taizo Anan, Kawasaki (JP); Kensuke Kuraki, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 122 days.

(21) Appl. No.: 13/850,001

(22) Filed: Mar. 25, 2013

(65) Prior Publication Data

US 2013/0251143 A1    Sep. 26, 2013

Related U.S. Application Data

(63) Continuation of application No. PCT/JP2010/067091, filed on Sep. 30, 2010.

(51) Int. Cl.
| | |
|---|---|
| H04L 9/28 | (2006.01) |
| G06F 21/62 | (2013.01) |
| H04L 9/08 | (2006.01) |
| H04N 1/44 | (2006.01) |

(52) U.S. Cl.
CPC ............ *H04L 9/28* (2013.01); *G06F 21/6209* (2013.01); *G06F 21/6272* (2013.01); *H04L 9/088* (2013.01); *H04L 9/0861* (2013.01); *H04N 1/4486* (2013.01); *G06F 2221/2107* (2013.01); *G06F 2221/2117* (2013.01)

(58) Field of Classification Search
None
See application file for complete search history.

(56) References Cited

U.S. PATENT DOCUMENTS

| | | | | |
|---|---|---|---|---|
| 5,764,770 | A * | 6/1998 | Schipper et al. | 713/176 |
| 7,085,423 | B2 * | 8/2006 | Tanigawa | 382/239 |
| 8,077,980 | B2 * | 12/2011 | Matsuzaki et al. | 382/209 |
| 2003/0169456 | A1 * | 9/2003 | Suzaki | 358/3.28 |
| 2006/0193491 | A1 * | 8/2006 | Nakamura et al. | 382/100 |
| 2008/0298596 | A1 | 12/2008 | Kuraki et al. | |
| 2009/0116643 | A1 * | 5/2009 | Hatano et al. | 380/59 |
| 2009/0245512 | A1 | 10/2009 | Masui et al. | |
| 2009/0323950 | A1 | 12/2009 | Nakagata et al. | |

(Continued)

FOREIGN PATENT DOCUMENTS

| | | |
|---|---|---|
| JP | 2008-301044 | 12/2008 |
| JP | 2008-301471 | 12/2008 |

(Continued)

OTHER PUBLICATIONS

International Search Report, mailed in connection with PCT/JP2010/067091 and mailed Dec. 28, 2010.

(Continued)

*Primary Examiner* — Matthew Henning
(74) *Attorney, Agent, or Firm* — Fujitsu Patent Center

(57) ABSTRACT

An image encryption system includes an encrypter configured to generate an encrypted image including an encrypted area by encrypting a partial area of an input image; an identification information generator configured to generate identification information for identifying the encrypted area based on an image of the encrypted area; and a registration unit configured to register the identification information and a decryption key for decrypting the encrypted area by making an association between the identification information and the decryption key.

9 Claims, 19 Drawing Sheets

(56) References Cited

U.S. PATENT DOCUMENTS

2010/0316222 A1 12/2010 Inami et al.
2013/0124868 A1* 5/2013 Sorotokin et al. ............ 713/176

FOREIGN PATENT DOCUMENTS

JP 2009-244768 10/2009
WO WO-2009/110055 9/2009

OTHER PUBLICATIONS

Notification of Transmittal of Translation of The International Preliminary Report on Patentability (Form PCT/IB/338, Form PCT/IB/373 & Form PCT/ISA/237), International Application No. PCT/JP2010/067091, 5 pages, dated Apr. 18, 2013.

* cited by examiner

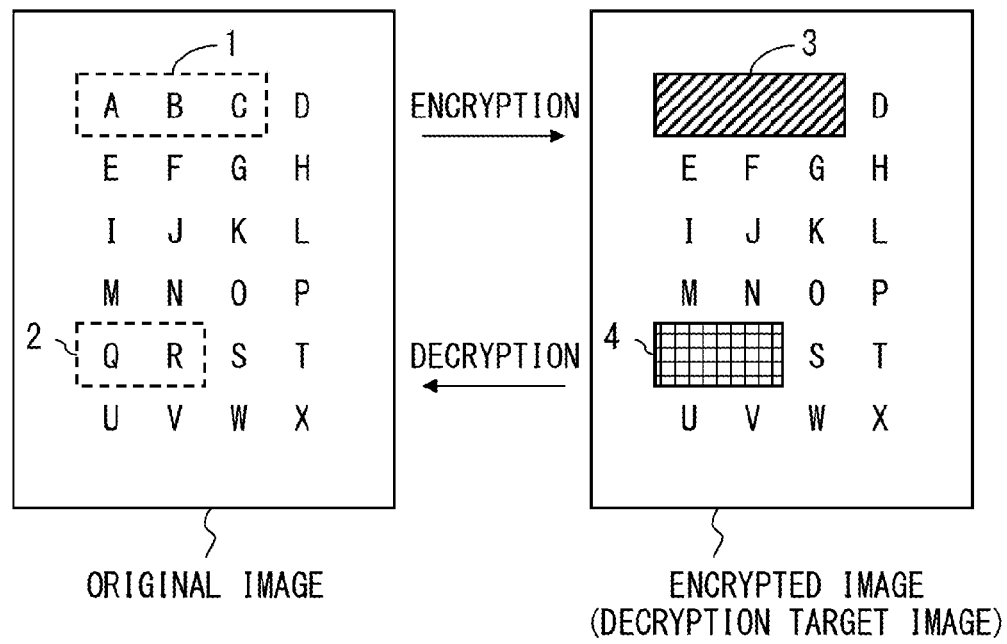
F I G. 1

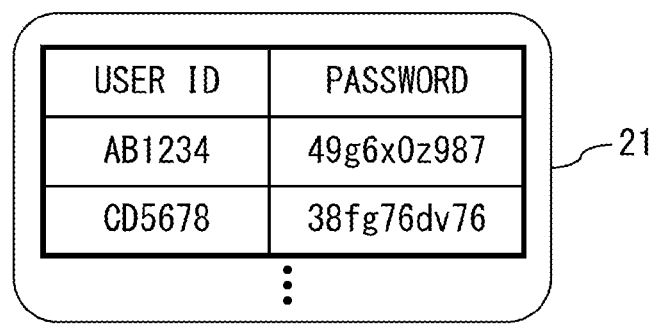
F I G. 3

| NUMBER OF BLOCKS | 5 | ← GENERATION RULE |
|---|---|---|
| IMAGE INFORMATION | | ← FEATURE DATA |
| POSITION INFORMATION | (8, 8) (72, 8) (32, 24) ··· | ← GENERATION RULE |

F I G. 8

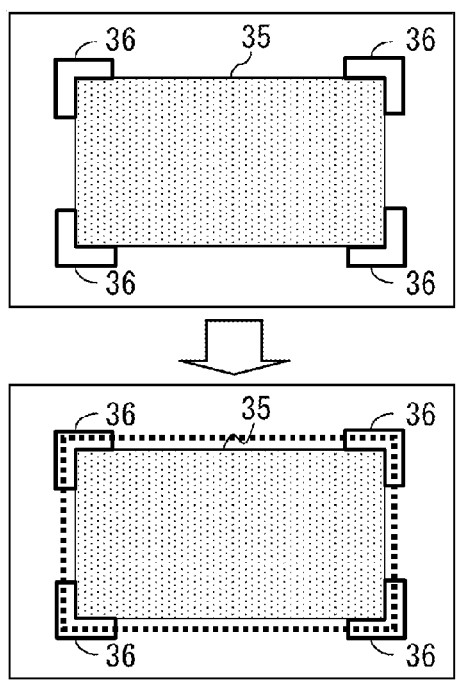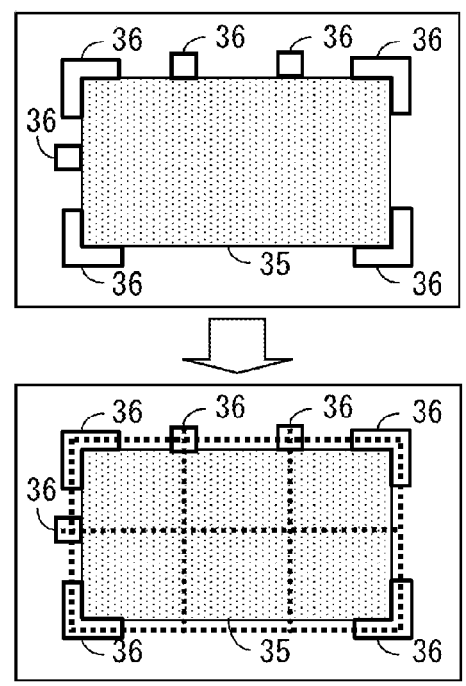
F I G. 1 2 A          F I G. 1 2 B

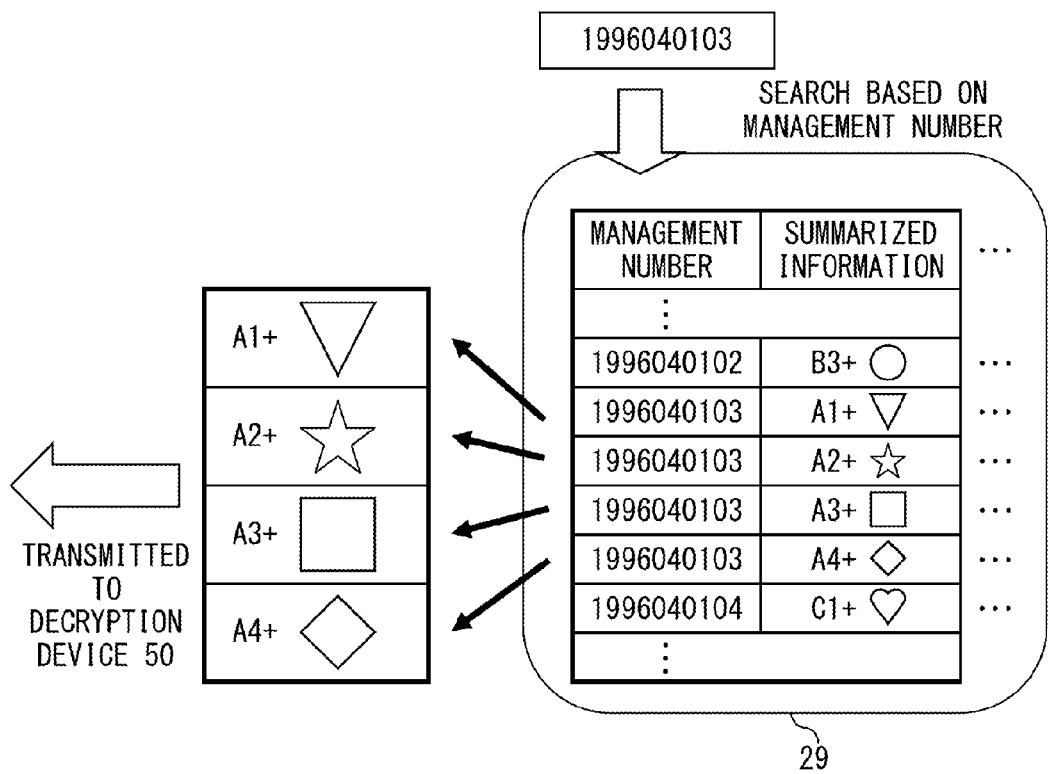
F I G. 1 4

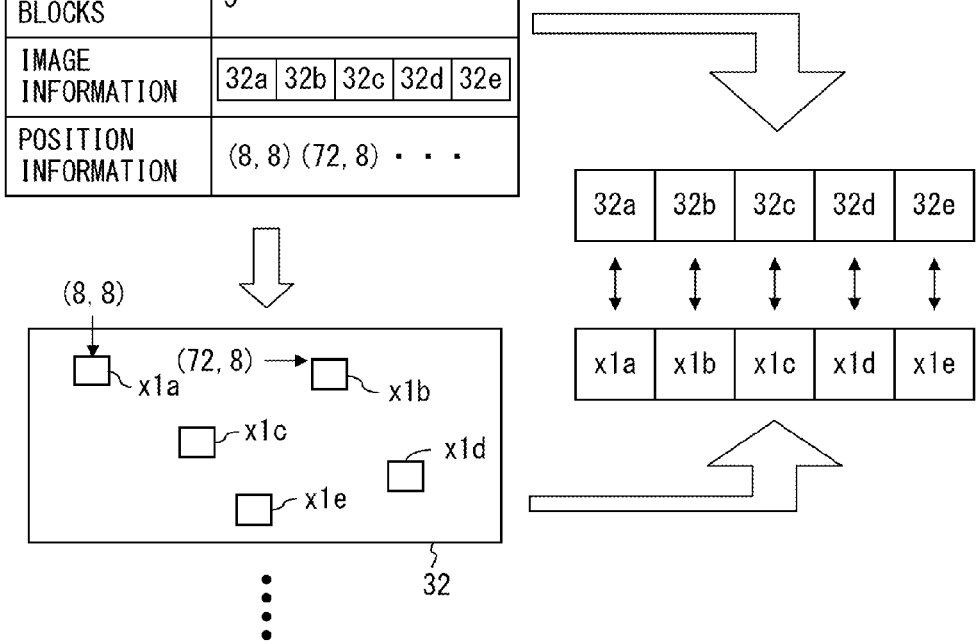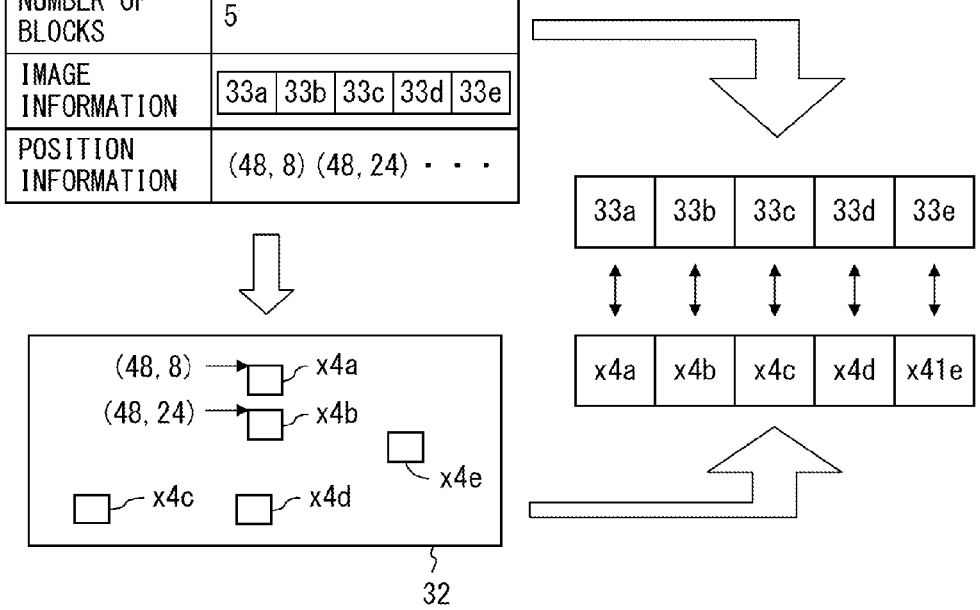
F I G. 1 7

IMAGE ENCRYPTION SYSTEM AND IMAGE DECRYPTION SYSTEM

CROSS-REFERENCE TO RELATED APPLICATION

This application is a continuation application of International Application PCT/JP2010/067091 filed on Sep. 30, 2010 and designated the U.S., the entire contents of which are incorporated herein by reference.

FIELD

The embodiments discussed herein are related to a system, a device and a method for encrypting an image and a system, a device and a method for decrypting an encrypted image.

BACKGROUND

Techniques for preventing secret information from leaking out have been studied and developed as an information society is making progress. By way of example, for digital data, a method for encrypting digital data, a method for authenticating a user, a method for restricting an access to digital data, and the like have been implemented.

In the real world, however, information leaks out of printed matters such as a paper medium and the like in many cases. For example, a statement of a credit card, a medical record of a hospital, a name list of a school, and the like include secret information. Accordingly, also development of a technique for preventing information written on printed matters from leaking out is demanded.

When information written on a printed matter is protected, for example, an area where secret information is written is processed into an unreadable state. In this case, for example, the area corresponding to the secret information is encrypted in a computer. Then, image data where the partial area is encrypted in this way is printed. As a result, the printed matter where the secret information is encrypted is obtained.

To read the secret information on the above described printed matter, a user generates digital data that represents an image of the printed matter, for example, by using a digital camera, a scanner or the like. Then, the secret information is regenerated by decoding the encrypted area.

As a related technique, an image encryption device for encrypting a digital image, digitized by an optical reader, into an encrypted image is proposed. This image encryption device includes encryption area specification means for specifying a partial area to be encrypted from a digital image, image conversion means for converting the partial area specified by the encryption area specification means into a processed image based on an encryption key, and pixel value conversion means for generating a converted image by regularly converting pixel values of the processed image converted by the image conversion means in order to make a position of the partial area identifiable (for example, Japanese Laid-open Patent Publication No. 2008-301044).

Additionally, the following encryption/decryption is proposed as another related technique. Namely, when an image where part of a document is encrypted to be unreadable is decrypted, a user reads the document as an electronic image, accesses a key management server, and is authenticated as an authorized user by using a decryption device. Then, a management number obtained from the image is transmitted from the decryption device to the key management server. The key management server extracts, from a key management database, position information of the encrypted part of the document and a decryption key for decrypting the encrypted part based on the obtained management number, and transmits the position information and the decryption key to the decryption device. The decryption device processes the image by using the position information and the decryption key to decrypt the encrypted part to be readable (for example, Japanese Laid-open Patent Publication No. 2008-301471).

When an image (the printed matter in the above described example) including an encrypted area is decoded, a user photographs the image by using a digital camera or the like as described above. Then, the decryption device decrypts the encrypted area by using a key corresponding to the encrypted area.

Here, when the encrypted image includes a plurality of encrypted areas, it is preferable to encrypt the encrypted areas respectively with different keys in order to improve security. In this case, an encryption key and a decryption key are managed for each of the encrypted areas in association with, for example, position information that represents a position within an encrypted image. By reading image data of the entire encrypted image, the decryption device can detect a position of an encrypted area to be decrypted within the encrypted image, and can obtain a decryption key corresponding to the position.

However, for example, when only a partial area of an encrypted image is taken when a user photographs the encrypted image with a digital camera, the decryption device cannot detect the position of the encrypted area to be decrypted within the encrypted image. In this case, the decryption device cannot obtain a key corresponding to the encrypted area, and thus cannot decrypt the encrypted area.

This problem occurs not only when image data of a target object is obtained by using a digital camera. Namely, for example, also if a scanner is set obliquely to a printed matter when image data of the printed matter is obtained by using the scanner, a similar problem may occur.

SUMMARY

According to an aspect of the embodiments, an image encryption system includes an encrypter configured to generate an encrypted image including an encrypted area by encrypting a partial area of an input image; an identification information generator configured to generate identification information for identifying the encrypted area based on an image of the encrypted area; and a registration unit configured to register the identification information and a decryption key for decrypting the encrypted area by making an association between the identification information and the decryption key.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory view of image encryption and image decryption according to an embodiment;

FIG. 3 illustrates an example of a user DB;

FIG. 8 illustrates an example of a data structure of summarized information;

FIGS. 12A and 12B illustrate an example of a method for extracting a decryption target area;

FIG. 14 is an explanatory view of a process for extracting summarized information from a key management DB;

FIG. 17 illustrates an example of the template matching;

DESCRIPTION OF EMBODIMENTS

FIG. 1 is an explanatory view of image encryption and image decryption according to an embodiment. In FIG. 1, an original image includes characters A to X.

An encryption device according to the embodiment encrypts a partial area of an original image. In the example illustrated in FIG. 1, the encryption device respectively encrypts areas 1 and 2 enclosed with a broken line. With this encryption process, the areas 1 and 2 are respectively encrypted, and an encrypted image including encrypted areas 3 and 4 is generated. At this time, the encryption device respectively encrypts the areas 1 and 2 with different encryption keys. Then, the encrypted image is printed, for example, on a paper medium or the like. In this case, a user who has obtained the encrypted image cannot read contents of the encrypted areas 3 and 4 although he or she can read the characters D to P and S to X from the encrypted image.

To regenerate the contents of the encrypted areas 3 and 4, the user obtains image data of the encrypted image. At this time, the user obtains the image data of the encrypted image by photographing the encrypted image with a digital camera. The image data of the encrypted image is input to the decryption device. Then, the decryption device obtains decryption keys of the encrypted areas 3 and 4, and respectively decrypts the encrypted areas 3 and 4.

<Encryption System>

Figure 2:
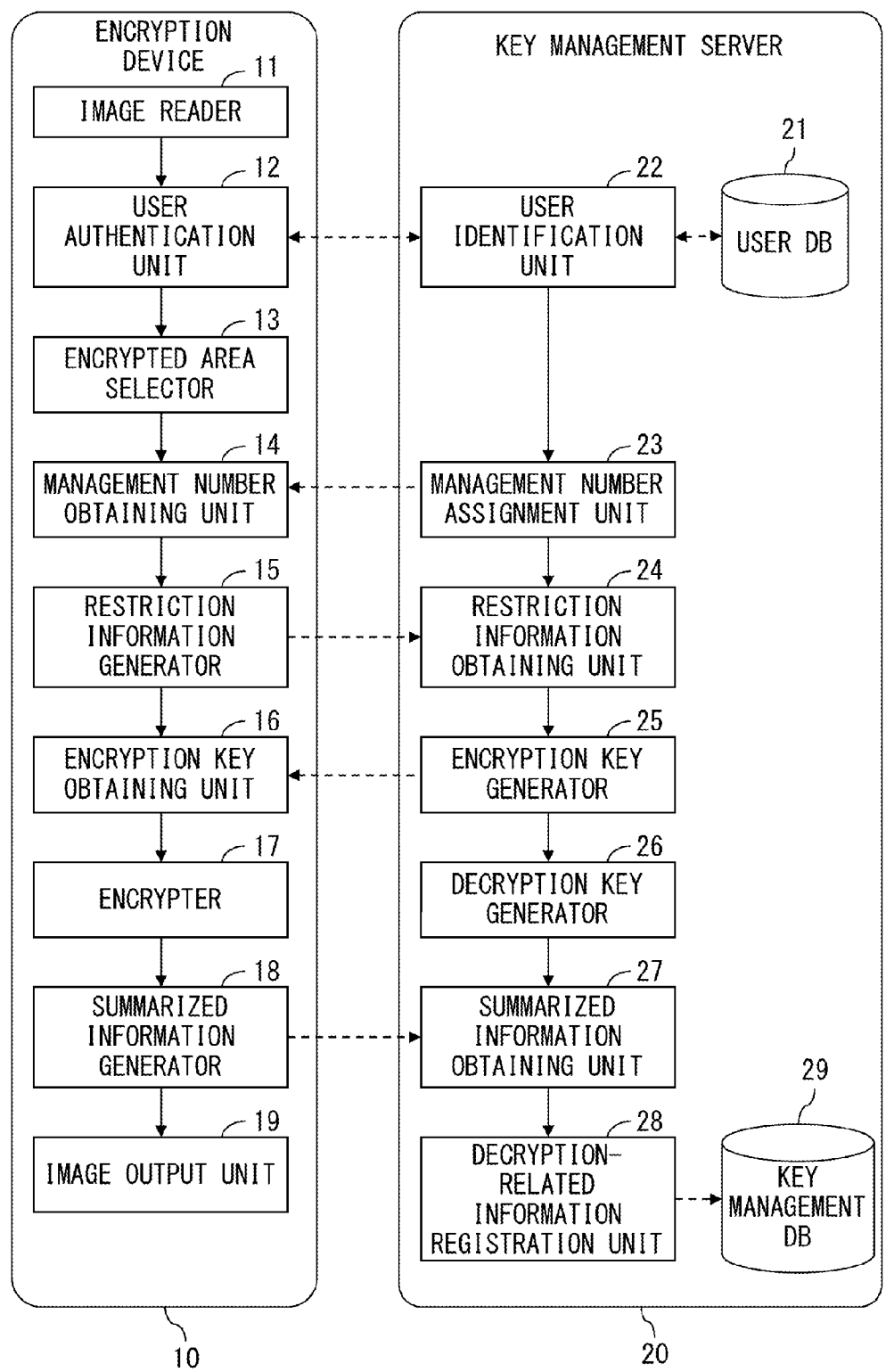
FIG. 2 illustrates a configuration of an encryption system according to the embodiment.

FIG. 2 illustrates a configuration of an encryption system according to the embodiment. The encryption system according to the embodiment includes an encryption device 10 and a key management server 20. The encryption device 10 can access the key management server 20, for example, via a communication line. The communication line may be, but not particularly limited to, for example, a LAN, a public network, or the like. In addition, the communication line may be implemented with a wireless link or a wired link.

The encryption device 10 includes an image reader 11, a user authentication unit 12, an encryption area selector 13, a management number obtaining unit 14, a restriction information generator 15, an encryption key obtaining unit 16, an encrypter 17, the summarized information generator 18, and an image output unit 19. The key management server 20 includes a user database (user DB) 21, a user identification unit 22, a management number assignment unit 23, a restriction information obtaining unit 24, an encryption key generator 25, a decryption key generator 26, a summarized information obtaining unit 27, a decryption-related information registration unit 28, and a key management database (key management DB) 29.

The image reader 11 reads an image that a user attempts to encrypt. This image is generated with, but not particularly limited to, for example, application software, and stored in a storage device. In this case, the image reader 11 reads the image from the storage device. In the following description, an image read by the image reader 11 is sometimes referred to as an input image.

The user authentication unit 12 authenticates the user who attempts to encrypt the input image. At this time, the user inputs, for example, a login ID and a password. The user authentication unit 12 requests the key management server 20 to authenticate the user by transmitting the input login ID and the password to the key management server 20. Then, the user authentication unit 12 receives a result of the authentication from the key management server 20.

The encryption area selector 13 selects a partial area of the input image. At this time, the encryption area selector 13 specifies the partial area to be encrypted, for example, according to an instruction of the user. In this case, the user specifies the partial area by using an input device such as a mouse, a keyboard, or the like. Alternatively, the encryption area selector 13 may specify the partial area to be encrypted according to default information. In the example illustrated in FIG. 1, the encryption area selector 13 selects the areas 1 and 2.

The management number obtaining unit 14 obtains a management number for uniquely identifying the input image from the key management server 20. Then, the management number obtaining unit 14 adds the obtained management number to the input image. In this case, the management number obtaining unit 14 generates, for example, a barcode or the like that represents the management number, and adds the barcode or the like to the input image. Alternatively, the management number obtaining unit 14 may display the management number on a display device connected to the encryption device 10. In this case, the user needs to memorize the management number.

The restriction information generator 15 generates decryption restriction information corresponding to the input image, and transmits the generated information to the key management server 20. The decryption restriction information includes, for example, a decryption-allowed user ID that represents a user having a decryption right, decryption-allowed period information that represents a period during which decryption is permitted, decryption-allowed count that represents the number of times that the decryption is permitted, and the like. The restriction information generator 15 generates the decryption restriction information, for example, according to an instruction of the user.

The encryption key obtaining unit 16 obtains, from the key management server 20, an encryption key for encrypting each partial area selected by the encryption area selector 13. In this example, the encryption key obtaining unit 16 obtains different encryption keys for the partial areas. Then, the encrypter 17 respectively encrypts the partial areas selected by the encryption area selector 13 with the use of the encryption keys obtained by the encryption key obtaining unit 16. As a result, the encrypted areas 3, 4 are generated in the example illustrated in FIG. 1. The encrypter 17 may encrypt the partial areas with, but not particularly limited to, for example, a method described in Japanese Laid-open Patent Publication No. 2008-301044.

The summarized information generator 18 generates summarized information (or contracted information) respectively for the encrypted areas generated by the encrypter 17. The summarized information is generated based on an image of an encrypted area as will be described in detail later. In this example, the summarized information includes feature data of an encrypted area, and generation rule data that represents a rule for generating the feature data. The summarized information generator 18 transmits the generated summarized information to the key management server 20. The summarized information generator 18 is an example of an identification information generator, and the summarized information is an example of identification information for identifying an encrypted area.

The image output unit 19 outputs an encrypted image including the encrypted areas generated by the encrypter 17. The image output unit 19 is, but not particularly limited to, for example, a printer that prints image data on paper or the like. In this case, the image output unit 19 prints the encrypted image. Alternatively, the image output unit 19 is an interface device for making a connection to the printer.

The user DB 21 stores (or manages) a user ID and a password of a user who uses the encryption device 10. The user ID and the password are preregistered, for example, by each user. FIG. 3 illustrates an example of the user DB 21. In the example illustrated in FIG. 3, a password "49g6x0z987" is registered for a user ID "AB1234", and a password "38fg76dv76" is registered for a user ID "CD5678".

The user identification unit 22 executes an authentication process in response to a user authentication request received from the encryption device 10, and returns a result of the authentication to the encryption device 10. At this time, when a pair of a user ID and a password, which have been received from the encryption device 10, is registered to the user DB 21, the user identification unit 22 determines that the user has been successfully authenticated. Namely, the user identification unit 22 determines that the user of the encryption device 10 is an authorized user.

The management number assignment unit 23 generates a management number for uniquely identifying an input image, and transmits the generated number to the encryption device 10. The management number may be implemented with, but not particularly limited to, for example, a sequence number. This management number is received by the management number obtaining unit 14 as described above. The restriction information obtaining unit 24 receives decryption restriction information transmitted from the encryption device 10. The decryption restriction information will be described later.

The encryption key generator 25 generates an encryption key for encrypting each partial area selected by the encryption area selector 13. At this time, the encryption key generator 25 may generate an encryption key for encrypting each partial area in response to a request issued from the encryption device 10. In this case, the encryption device 10 notifies the key management server 20 of the number of partial areas to be encrypted. The encryption key generator 25 generates different encryption keys for the partial areas in this example. The encryption key generator 25 generates an encryption key, for example, by using a random number.

The decryption key generator 26 generates a decryption key corresponding to the encryption key generated by the encryption key generator 25. When the encryption system according to the embodiment employs a common key encryption system, the decryption key generator 26 generates a copy of a corresponding encryption key as a decryption key. The summarized information obtaining unit 27 obtains summarized information transmitted from the encryption device 10.

The decryption-related information registration unit 28 registers decryption-related information corresponding to each encrypted area of an encrypted image to the key management DB 29. The decryption-related information includes a management number generated by the management number assignment unit 23, summarized information obtained by the summarized information obtaining unit 27, decryption restriction information obtained by the restriction information obtaining unit 24, and a decryption key generated by the decryption key generator 26. The key management DB 29 is an example of a registration unit.

Figure 4:
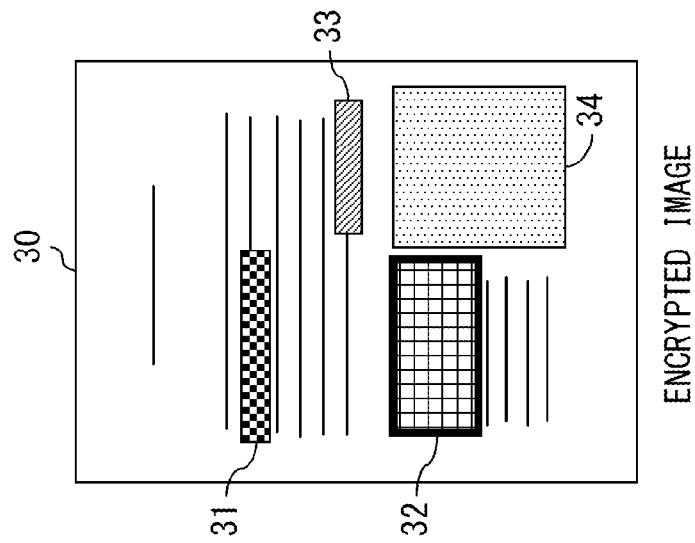
FIG. 4 illustrates an example of decryption-related information registered to a key management DB.

FIG. 4 illustrates an example of the decryption-related information registered to the key management DB 29. In the example illustrated in FIG. 4, an encrypted image 30 includes four encrypted areas 31 to 34. Moreover, a management number "1996040103" is assigned to the encrypted image 30 by the management number assignment unit 23.

In this case, when the encryption device 10 generates the encrypted image 30 including the encrypted areas 31 to 34, the decryption-related information registration unit 28 generates decryption-related information respectively for the encrypted areas 31 to 34, and registers the generated information to the key management DB 29. Namely, four sets of decryption-related information respectively corresponding to the encrypted areas 31 to 34 are registered to the key management DB 29. FIG. 4 illustrates the decryption-related information of arbitrary one of the encrypted areas 31 to 34.

In the example illustrated in FIG. 4, all the encrypted areas 31 to 34 are included in the encrypted image 30. Accordingly, management numbers of the decryption-related information corresponding to the encrypted areas 31 to 34 are the same (here 1996040103). Note that summarized information and a decryption key are different respectively for the encrypted areas. Moreover, decryption restriction information may be different respectively for the encrypted areas or may be identical for a plurality of encrypted areas within the same encrypted image.

The key management server 20 is used in the encryption system illustrated in FIG. 2, and also used in a decryption system to be described later. Accordingly, the key management server 20 includes components for a decryption process in addition to the components 21 to 29 illustrated in FIG. 2.

Figure 5:
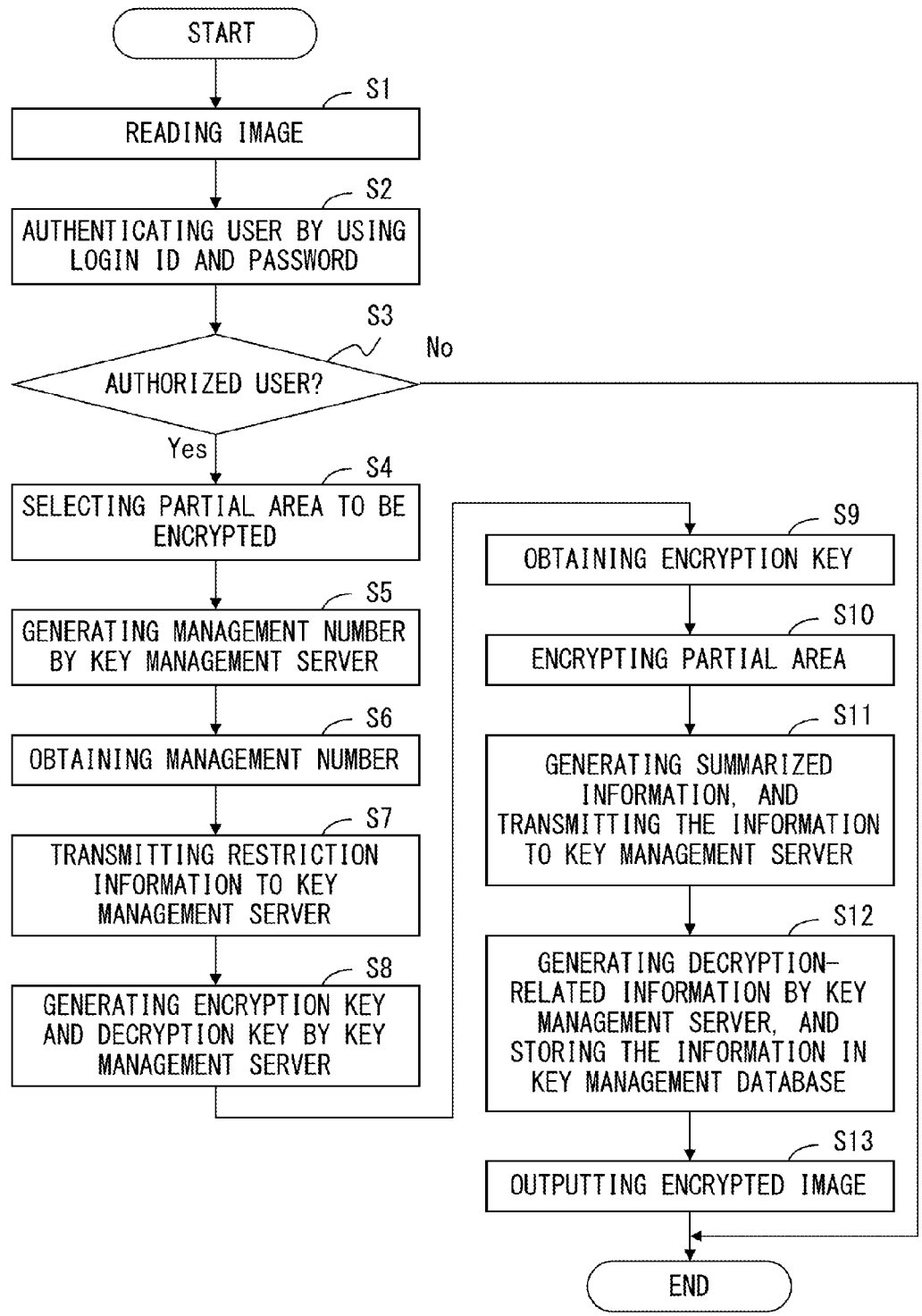
FIG. 5 is a flowchart illustrating a process of the encryption system according to the embodiment.

FIG. 5 is a flowchart illustrating a process of the encryption system according to the embodiment. The process represented by this flowchart is started, for example, when a user specifies an image to be encrypted and instructs the encryption device 10 to encrypt the image.

In step S1, the image reader 11 reads the image that the user attempts to encrypt. Note that, however, the input image is not limited to image data. For example, when the image reader 11 reads an image of a printed matter, image data obtained by photographing or shooting the printed matter by using a digital camera, a scanner or the like is input to the encryption device 10.

In steps S2 and S3, the user authentication unit 12 requests the key management server 20 to authenticate the user by transmitting a login ID and a password, which have been input by the user, to the key management server 20. The user identification unit 22 determines whether or not a set of the user ID and the password, which have been received from the user authentication unit 12, is registered to the user DB 21. Then, the user identification unit 22 notifies the user authentication unit 12 of a result of the authentication. When the user has been successfully authenticated, steps S4 to S13 are executed. Alternatively, when the user has been unsuccessfully authenticated, the encryption system terminates the process.

In step S4, the encryption area selector 13 selects one or a plurality of partial areas to be encrypted (namely, encryption target areas) in the input image, for example, according to an instruction of the user or default information. In step S5, the management number assignment unit 23 generates a management number for uniquely identifying the input image, and notifies the encryption device 10 of the generated number. The management number obtaining unit 14 receives the management number generated by the management number assignment unit 23 in step S16. Then, the management number obtaining unit 14 adds the management number to the input image. Alternatively, the management number obtaining unit 14 presents the management number to the user.

In step S7, the restriction information generator 15 generates decryption restriction information corresponding to the input image, and transmits the generated information to the key management server 20. The decryption restriction information includes, for example, a decryption-allowed user ID, decryption-allowed period information, decryption-allowed count information, and the like as described above. Then, the restriction information obtaining unit 24 receives the decryption restriction information generated by the restriction information generator 15.

In step S8, the encryption key generator 25 generates an encryption key for encrypting each partial area selected by the encryption area selector 13, and transmits the generated key to the encryption device 10. The decryption key generator 26 generates a decryption key corresponding to the encryption key generated by the encryption key generator 25.

In step S9, the encryption key obtaining unit 16 obtains the encryption key for encrypting each partial area selected by the encryption area selector 13 from the encryption key generator 25. In step S10, the encrypter 17 encrypts each partial area selected by the encryption area selector 13 with the use of the encryption key obtained by the encryption key obtaining unit 16.

In step S11, the summarized information generator 18 generates summarized information for each encrypted area generated by the encrypter 17. Then, the summarized information generator 18 transmits the generated summarized information to the key management server 20. The summarized information obtaining unit 27 obtains the summarized information generated by the summarized information generator 18.

In step S12, the decryption-related information registration unit 28 generates decryption-related information for each of the encrypted areas of the encrypted image, and registers the generated information to the key management DB 29. In this example, the decryption-related information includes a management number, summarized information, decryption restriction information, and a decryption key as described above. The decryption-related information registration unit 28 may compress and register the summarized information to the key management DB 29. In this case, a compression method may be a lossless method or a lossy method. In addition, the decryption-related information registration unit 28 may use, for example, Huffman encoding, quantization of a discrete cosine transform (DCT) coefficient, or the like as the compression method. By compressing the summarized information, the storage amount of the key management DB 29 can be reduced.

In step S13, the image output unit 19 outputs the encrypted image including the encrypted areas generated by the encrypter 17.

As described above, in the encryption system according to the embodiment, the encryption device 10 transmits summarized information of each encrypted area to the key management server 20 after the encryption device 10 encrypts one or a plurality of partial areas in an input image. Moreover, the key management server 20 registers the summarized information and a decryption key by making an association between the summarized information and the decryption key for each encrypted area encrypted by the encryption device 10.

Summarized information is described next. The summarized information is identification information for identifying each encrypted area within an encrypted image, and generated by the summarized information generator 18 based on image information (feature data) of each encrypted area.

Figure 6:
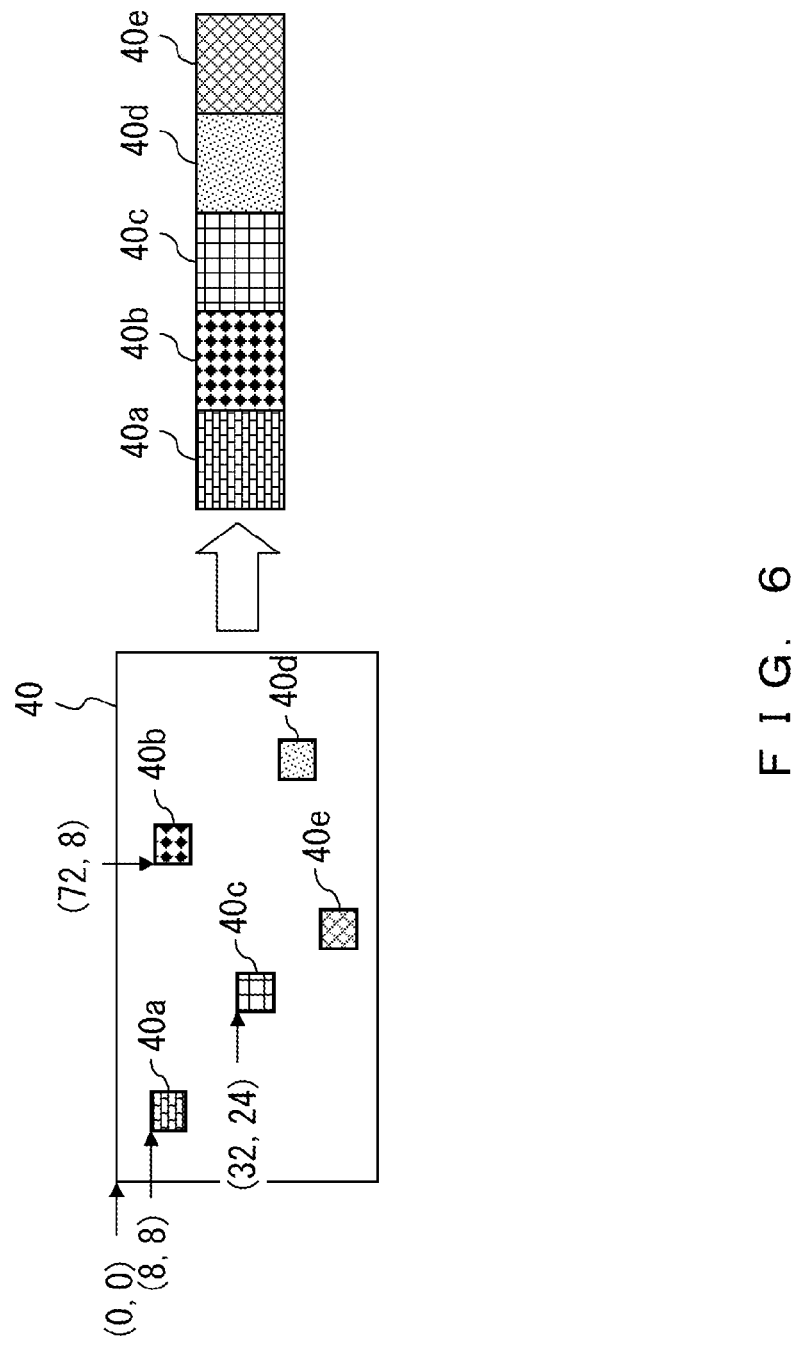
FIG. 6 is an explanatory view of a method for generating summarized information.

FIG. 6 is an explanatory view of a method (first generation method) for generating summarized information. In FIG. 6, an encrypted area 40 represents one encrypted area or one of a plurality of encrypted areas generated within an encrypted image.

The summarized information generator 18 partitions the encrypted area 40 into a plurality of blocks. A size of the blocks is, but not particularly limited to, for example, 8×8 pixels. A shape of the blocks may not be square.

The summarized information generator 18 extracts a predetermined number of blocks from among the plurality of blocks obtained by partitioning the encrypted area 40. In the example illustrated in FIG. 6, the summarized information generator 18 extracts five blocks 40*a* to 40*e* from the encrypted area 40.

Here, blocks extracted from an encrypted area are used to identify the encrypted area as described above. Accordingly, it is preferable that each of the blocks extracted by the summarized information generator 18 has "feature". In other words, for example, if an image of an extracted block does not have an edge (especially, a blank area with no pattern), an identification ability of summarized information is low. In this case, a difference in summarized information among a plurality of encrypted areas is small, and a possibility that the decryption device erroneously obtains decryption-related information corresponding to an encrypted area to be decrypted increases in a decryption process to be described later. In this case, it is difficult for the decryption device to decrypt the encrypted area.

Accordingly, in the encryption method according to the embodiment, the summarized information generator 18 extracts a block having a high degree of complexity from the encrypted area 40. Namely, the summarized information generator 18 extracts a block from the encrypted area 40 so that summarized information has a lot more information amount.

Figure 7:
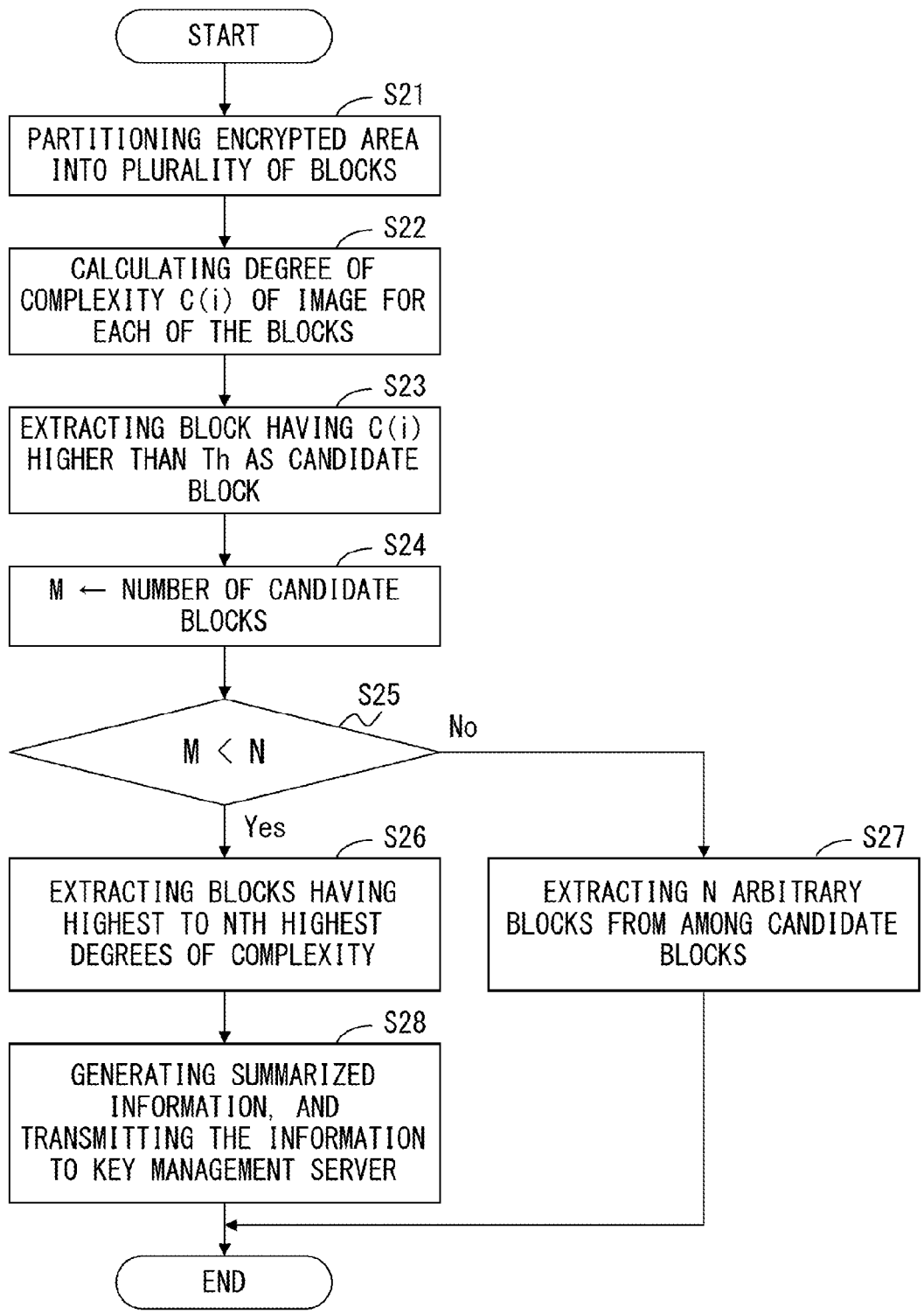
FIG. 7 is a flowchart illustrating a method for generating summarized information.

FIG. 7 is a flowchart illustrating the method for generating summarized information. A process represented by this flowchart is executed for each encrypted area by the summarized information generator 18. Namely, the summarized information generator 18 generates summarized information by executing the process represented by the flowchart of FIG. 7 for each encrypted area generated by the encrypter 17.

In step S21, the summarized information generator 18 partitions an encrypted area into a plurality of blocks. In the following description, each of the blocks takes the shape of a square having a size of B pixels in a vertical direction and a horizontal direction (B×B pixels).

In step S22, the summarized information generator 18 calculates a parameter C(i) that represents the degree of complexity of an image in each of the blocks within the encrypted area based on the following expression (1). "i" identifies each of the blocks within the encrypted area. Namely, C(i) represents the degree of complexity of an image of the block within the encrypted area. Note that f(i,x,y) represents a pixel value at a position (x,y) within the block i. Here, the position (x,y) represents coordinates when an upper left corner of the block is defined as an origin. Moreover, the pixel value is, for example, RGB data. Alternatively, the pixel value may be luminance data.

$$C(i) = \sum_{x=1}^{B-2}\sum_{y=0}^{B-1} |D_{xx}(i,x,y)|^2 + \sum_{x=0}^{B-2}\sum_{y=0}^{B-2} |D_{xy}(i,x,y)|^2 + \\ \sum_{x=0}^{B-2}\sum_{y=0}^{B-2} |D_{yx}(i,x,y)|^2 + \sum_{x=0}^{B-1}\sum_{y=1}^{B-2} |D_{yy}(i,x,y)|^2$$ (Expression 1)

where Dxx(i,x,y), Dxy(i,x,y), Dyx(i,x,y) and Dyy(i,x,y) are calculated based on the following equations.

$Dxx(i,x,y)=f(i,x+1,y)-2f(i,x,y)+f(i,x-1,y)$ $Dxy(i,x,y)=Dyx(i,x,y)=f(i,x+1,y+1)-f(i,x,y+1)-f(i,x+1,y)+f(i,x,y)$ $Dyy(i,x,y)=f(i,x,y+1)-2f(i,x,y)+f(i,x,y-1)$

For example, when the degree of complexity of the image of the block i is low, a difference in a pixel value f between adjacent pixels is small. In this case, all absolute values of Dxx(i,x,y), Dxy(i,x,y), Dyx(i,x,y) and Dyy(I,x,y) become small. Accordingly, the value of C(i) calculated with the expression (1) also becomes small. In contrast, when the image in the block i has a pattern (namely, an edge), a difference in the pixel value f between adjacent pixels in the neighborhood of the edge is large. Therefore, at least one of the absolute values of Dxx(i,x,y), Dxy(i,x,y), Dyx(i,x,y) and Dyy(I,x,y) becomes large, and the value of C(i) calculated based on the expression (1) also becomes large.

In step S23, the summarized information generator 18 extracts a block having a higher degree of complexity C than a specified threshold level Th. Namely, the summarized information generator 18 extracts a block having an image that is more complex than the threshold level as a candidate block for summarized information.

In steps S24 and S25, the summarized information generator 18 makes a comparison between the number of candidate blocks (M) extracted in step S23 and the number of blocks (N) used for the summarized information. N is "5" in the example illustrated in FIG. 6.

When M is smaller than N, it is determined that the number of candidate blocks is smaller than the number of blocks used for the summarized information, and step S26 is executed. In step S26, the summarized information generator 18 extracts blocks having the highest to the Nth highest degrees of complexity C. Namely, N blocks having higher degrees of complexity C are extracted.

In contrast, when M is not smaller than N (namely, M is equal to or larger than N), it is determined that the number of candidate blocks is equal to or larger than the number of blocks used for the summarized information, and step S27 is executed. In step S27, the summarized information generator 18 extracts arbitrary N blocks from among the M blocks extracted in step S23.

In step S28, the summarized information generator 18 generates the summarized information, and transmits the generated information to the key management server 20. The summarized information includes image information of the N blocks extracted in step S26 or S27.

FIG. 8 illustrates an example of a data structure of summarized information. The summarized information includes generation rule data and feature data in this example. The generation rule data includes information that represents the number of blocks extracted from an encrypted area for summarized information, and information that represents position of the extracted blocks. The feature data is image information of the extracted blocks.

In the example illustrated in FIG. 6, the number of blocks extracted from the encrypted area for the summarized information is "5". Moreover, the position of each of the blocks represents coordinates of the block when an upper left corner of the encrypted area is defined as an origin. For example, position information of the blocks 40a, 40b and 40c are "8,8", "72,8", and "32,24", respectively. Moreover, the feature data is image information of the extracted blocks, and implemented, for example, with RGB data of each pixel within each of the blocks.

As described above, the summarized information generator 18 generates summarized information according to the flowchart illustrated in FIG. 7 for each encrypted area generated by the encrypter 17. However, in the flowchart illustrated in FIG. 7, the summarized information generator 18 may not make a comparison between the degree of complexity C(i) of each block and the threshold level Th. Namely, the summarized information generator 18 may extract blocks having the highest to the Nth highest degrees of complexity C from among all blocks belonging to each encrypted area. In this case, the processes of steps S23 to S25 and S27 is not needed in the flowchart illustrated in FIG. 7.

Figure 9:
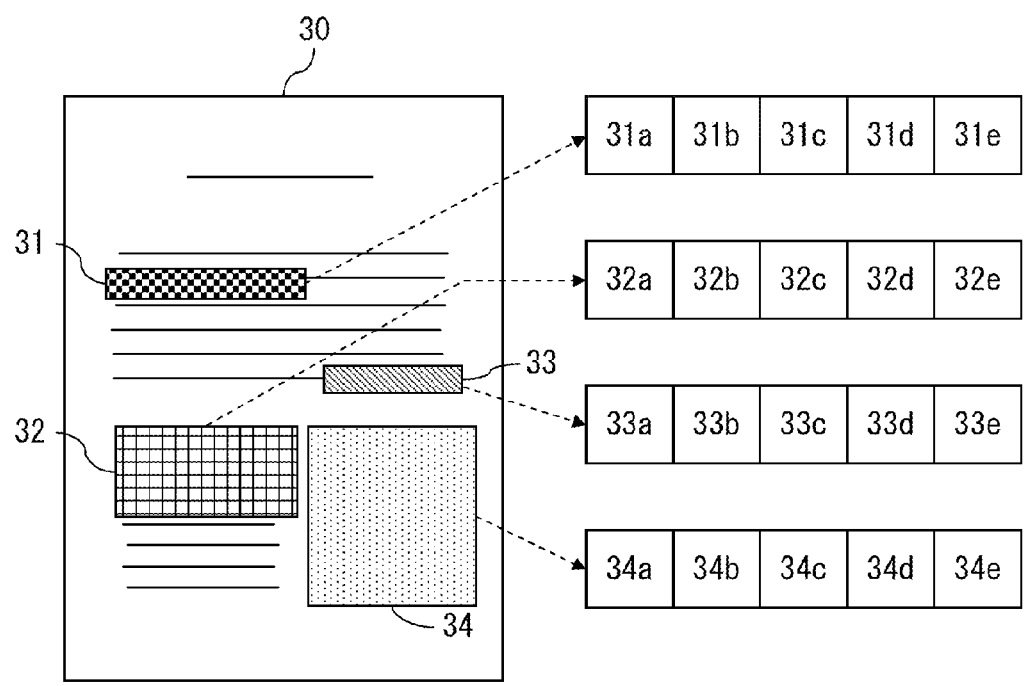
FIG. 9 is an explanatory view of another method for generating summarized information.

FIG. 9 is an explanatory view of another method (second generation method) for generating summarized information. Here, assume that a plurality of encrypted areas are generated in one encrypted image. Similarly to FIG. 4, the encrypted areas 31 to 34 are generated in the encrypted image 30 in FIG. 9.

Also in the second generation method, the summarized information generator 18 extracts five blocks respectively from encrypted areas in order to generate summarized information of the encrypted areas. In FIG. 9, the summarized information generator 18 extracts blocks 31a to 31e from the encrypted area 31, extracts blocks 32a to 32e from the encrypted area 32, extracts blocks 33a to 33e from the encrypted area 33, and further extracts blocks 34a to 34e from the encrypted area 34.

Here, image information of the blocks extracted from the encrypted areas are used to identify the encrypted areas as described above. Therefore, when a difference between image information of each of the blocks 31a to 31e and that of each of the blocks 32a to 32e is assumed to be small, it is difficult to make a distinction between the encrypted areas 31 and 32 in the decryption process to be described later. Namely, to properly identify encrypted areas in the decryption process, it is preferable that a correlation among image information of blocks extracted from encrypted areas is low.

Accordingly, when a plurality of encrypted areas is generated in one encrypted image, the summarized information generator 18 extracts a specified number of blocks from each encrypted area so that a correlation between an image of a block extracted from one encrypted area and that of a block extracted from another encrypted area becomes low. Specifically, blocks are extracted respectively from encrypted areas, for example, as follows.

Initially, the summarized information generator 18 extracts the five blocks 31a to 31e from the encrypted area 31. At this time, the summarized information generator 18 extracts the blocks 31a to 31e from the encrypted area 31, for example, with the method represented by the flowchart illustrated in FIG. 7. However, the summarized information generator 18 may extract the blocks 31a to 31e with another method.

Next, the summarized information generator 18 extracts the blocks 32a to 32e from the encrypted area 32. At this time, the summarized information generator 18 extracts the block 32a from the encrypted area 32 so that the image of the block 32a has a low correlation with that of the block 31a. Moreover, the summarized information generator 18 extracts the blocks 32b to 32e from the encrypted area 32 so that each of the images of the blocks 32b, 32c, 32d and 32e has a low correlation with each of the images of the blocks 31b, 31c, 31d and 31e.

Additionally, the summarized information generator 18 extracts the blocks 33a to 33e from the encrypted area 33. At this time, the summarized information generator 18 extracts the block 33a from the encrypted area 33 so that the image of the block 33a has a low correlation with those of the blocks 31a and 32a. The summarized information generator 18 extracts the blocks 33b to 33e similarly from the encrypted area 33.

Lastly, the summarized information generator 18 extracts the blocks 34a to 34e from the encrypted area 34. At this time, the summarized information generator 18 extracts the block 34a from the encrypted area 34 so that the image of the block 34a has a low correlation with those of the blocks 31a, 32a and 33a. The summarized information generator 18 extracts the blocks 34b to 34e similarly from the encrypted area 34.

When the blocks are extracted from the encrypted areas with the above described procedures, the correlations of the summarized information among the encrypted areas are low. Accordingly, the decryption device can properly identify and decrypt the encrypted areas in the decryption process to be described later.

Figure 10:
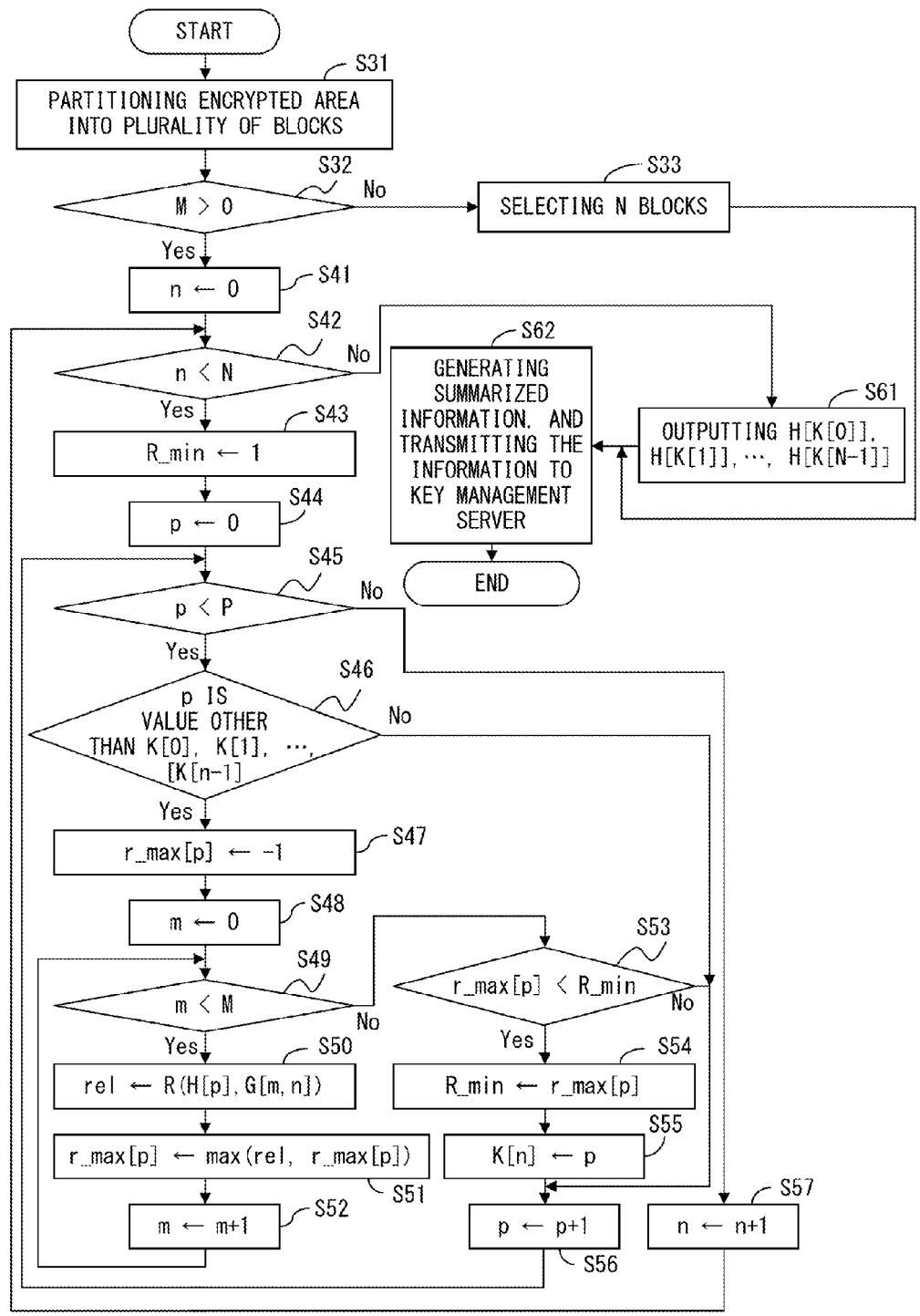
FIG. 10 is a flowchart illustrating the other method for generating summarized information.

FIG. 10 is a flowchart illustrating the second generation method for generating summarized information. The process represented by this flowchart is executed by the summarized information generator 18 for each encrypted area. In a description of the flowchart illustrated in FIG. 10, the following parameters and variables are used.

P: Total number of blocks obtained by partitioning an encrypted area
p: Variable for respectively identifying P blocks (variable for respectively identifying 0 to P)
N: Number of blocks extracted from an encrypted area (N=5 in FIG. 9)
n: Variable for respectively identifying 0 to N
M: Number of encrypted areas for which summarized information has been generated earlier
m: Variable for respectively identifying 0 to M
G[m, n]: nth block extracted from an mth encrypted area for which summarized information has been generated earlier
H[p]: pth block within an encrypted area
K[n]: Block index that represents the nth block extracted from an encrypted area In step S31, the summarized information generator 18 partitions an encrypted area into a plurality of blocks. Each of the blocks takes the shape of a square having a size of B pixels in a vertical direction and a horizontal direction (B×B pixels) similarly to the first generation method illustrated in FIG. 7.

In step S32, the summarized information generator 18 determines whether or not an encrypted area for which summarized information has been generated earlier is present in a target encrypted image. When the encrypted area for which summarized information has been generated earlier is not present, M is equal to 0. Therefore, the summarized information generator 18 executes step S33. Alternatively, when the encrypted area for which summarized information has been generated earlier is present, the process of the summarized information generator 18 proceeds to step S41.

When the flowchart illustrated in FIG. 10 is executed for the initial encrypted area within the encrypted image, the summarized information generator 18 extracts N blocks from among P blocks in step S33. At this time, the summarized information generator 18 selects the N blocks, for example, with the method illustrated in FIG. 7.

When the flowchart illustrated in FIG. 10 is executed for the second and subsequent encrypted areas within the encrypted image, the summarized information generator 18 initializes the variable n to 0 in step S41. Thereafter, the summarized information generator 18 selects the N blocks by repeatedly executing the process of steps S42 to S57 while incrementing the variable n to N.

In step S42, the summarized information generator 18 determines whether or not the variable n has reached N. If the variable n is smaller than N, the process proceeds to step S43 in order to select the next block. Alternatively, if the variable n has reached N, it is determined that the N blocks have been selected. The process therefore proceeds to step S61.

The process of steps S42 to S57 is described. In the following description, a block of B×B pixels is represented with a vector of B×B dimensions including pixel values within the block as elements. At this time, a pixel value at a position (i,j) when an upper left corner of a block a is defined as an origin is referred to as "a(i,j)". In this case, the block a is represented by the following expression (2).

$$a = \{a(0,0), a(0,1), \ldots, a(0,B-1), a(1,0), \ldots, a(i,j), \ldots, a(B-1,B-2), a(B-1,B-1)\} \quad \text{(Expression 2)}$$

A correlation R(a,b) between block a and block b is represented by the following expressions (3) and (4).

$$R(a, b) = \frac{a \cdot b}{|a||b|} \quad \text{(Expression 3)}$$

$$a \cdot b = \sum_{i=0}^{B-1} \sum_{j=0}^{B-1} a(i, j) b(i, j) \quad \text{(Expression 4)}$$

Here, the summarized information generator 18 decides a block index K[n] for identifying the nth block selected from the target encrypted area. K[n] is calculated with the following expression (5) if n is equal to 0. Alternatively, K[n] is calculated with the following expression (6) if n is equal to or larger than 1.

$$K[0] = \underset{p=0,\ldots,P-1}{\operatorname{argmin}} \left[ \underset{m=0,\ldots,M-1}{\max} R(H[p], G[m, 0]) \right] \quad (n=0) \quad \text{(Expression 5)}$$

$$K[n] = \underset{p \in S(n)}{\operatorname{argmin}} \left[ \underset{m=0,\ldots,M-1}{\max} R(H[p], G[m, n]) \right] \quad (n \geq 1) \quad \text{(Expression 6)}$$

where argmin[a[p]] is an operator for obtaining "p" that minimizes [a[p]]. Moreover, in the expression (6), a set S(n) represents a set of integers excluding K[0], K[1], . . . , K[n−1]

from among integers 0 to P−1. Namely, the expressions (5) and (6) respectively represent a process for selecting the block index K[n] for identifying a block that minimizes a correlation with the block G[m,n] selected in an encrypted area, for which summarized information has been generated earlier, from each block H[p] of the target encrypted area.

At this time, the summarized information generator 18 respectively calculates a maximum value (namely, the worst value) of a correlation between each block H[p] of the target encrypted area and the block G[m,n] of the encrypted area for which summarized information has been generated earlier. Then, the summarized information generator 18 searches for a block that minimizes the maximum value of the above described correlation among blocks belonging to the target encrypted area. The process of steps S42 to S57 is specifically described below.

In step S43, the summarized information generator 18 assigns "1" to the variable R_min. In step S44, the summarized information generator 18 assigns "0" to the variable p. In step S45, the summarized information generator 18 determines whether or not the variable p has reached P. If the variable p has not reached P, the process proceeds to step S46. In contrast, if the variable p has reached P, the process proceeds to step S57.

In step S46, the summarized information generator 18 determines whether or not the block p extracted from the target encrypted area has been already selected to be used as summarized information. Namely, step S46 is provided to prevent the same block from being selected redundantly from the target encrypted area, and is equivalent to "p∈S(n)" in the expression (6). If the block p has not been selected yet, the process proceeds to step S47. Alternatively, if the block p has been already selected, the summarized information generator 18 increments the variable p by 1 in step S56.

In step S47, the summarized information generator 18 assigns "−1" to a variable r_max [p]. In step S48, the summarized information generator 18 assigns "0" to the variable m. In steps S49 to S52, the summarized information generator 18 executes the following process between the nth block G[m,n] selected in each encrypted area, for which summarized information has been generated earlier, and the pth block H[p] in the target encrypted area. Namely, in step S50, the summarized information generator 18 calculates a correlation between the block G[m,n] and the block H[p], and assigns a result of the calculation to the variable rel in step S50. Then, in step S51, the summarized information generator 18 holds the variable r_max[p] if the variable rel is equal to or smaller than the variable r_max[p]. In contrast, the summarized information generator 18 assigns the variable rel to the variable r_max[p] if the variable rel is larger than the variable r_max[p]. Namely, in steps S49 to S52, the maximum value (that is, r_max[p]) of the correlations is obtained between the nth block G[m,n] selected in each encrypted area, for which summarized information has been generated earlier, and the pth block H[p] in the target encrypted area.

In step S53, the summarized information generator 18 makes a comparison between the variable r_max[p] and the variable R_min. If the variable r_max[p] is smaller than the variable R_min, the summarized information generator 18 assigns the variable r_max[p] to the variable R_min in step S54. Moreover, the summarized information generator 18 assigns the variable p to the block index K[n] in step S55. Thereafter, in step S56, the summarized information generator 18 increments the variable p by 1. If the variable r_max[p] is equal to or larger than the variable R_min, steps S54 and S55 are skipped.

The summarized information generator 18 executes the process of steps S45 to S56 for each of the blocks belonging to the target encrypted area. After the summarized information generator 18 has executed the process of steps S45 to S56 for all the blocks within the encrypted area ("NO" (p=P) in step S45), the summarized information generator 18 increments the variable n by 1 in step S57.

The summarized information generator 18 repeatedly executes the process of steps S42 to S57 until the N blocks are selected from the target encrypted area. When the N blocks have been selected from the target encrypted area ("NO" (n=N) in step S42), the summarized information generator 18 identifies the N blocks H[K[0]] to H[K[N−1]] in step S61.

In step S62, the summarized information generator 18 generates summarized information, and transmits the generated information to the key management server 20. Here, the summarized information includes image information of the N blocks identified in step S33 or S61.

One example of the process represented by the flowchart illustrated in FIG. 10 is described. The following description assumes that the summarized information of the encrypted areas 31 to 33 illustrated in FIG. 9 have been already generated and the summarized information generator 18 generates summarized information of the encrypted area 34. Namely, the encrypted area 34 is a target encrypted area. Also assume that the summarized information generator 18 selects the first block from the encrypted area 34.

In this case, the determination in step S32 results in "YES" since M is equal to 3. Also the determination in step S42 results in "YES" since N is equal to 5 and n is equal to 1. Accordingly, the summarized information generator 18 executes the process of steps S45 to S56 after the summarized information generator 18 assigns "0" to the variable p.

Specifically, the summarized information generator 18 respectively calculates a correlation between the block 31a selected from the encrypted area 31 and a block 0 of the encrypted area 34, a correlation between the block 32a selected from the encrypted area 32 and the block 0 of the encrypted area 34, and a correlation between the block 33a selected from the encrypted area 33 and the block 0 of the encrypted area 34, and obtains a maximum value r_max[0] among the calculated correlations. Note that the block 0 represents a block identified with the variable p=0. Then, r_max [0] is assigned to the variable R_min. Additionally, the variable p (p=0 at this time point) is assigned to the block index K[0].

Next, the summarized information generator 18 executes a similar process for p=1. Namely, the summarized information generator 18 executes steps S45 to S56 for the next block of the encrypted area 34. Specifically, the summarized information generator 18 respectively calculates a correlation between the block 31a selected from the encrypted area 31 and the block 1 of the encrypted area 34, a correlation between the block 32a selected from the encrypted area 32 and the block 1 of the encrypted area 34, and a correlation between the block 33a selected from the encrypted area 33 and the block 1 of the encrypted area 34, and obtains a maximum value r_max[1] among the calculated correlations. Note that the block 1 represents a block identified with the variable p=1. If r_max [1] is smaller than the R_min, the variable p (p=1 at this time point) is assigned to the block index K[0]. At this time, r_max[1] is assigned to the variable R_min. If r_max [1] is equal to or larger than R_min, the block index K[0] and the variable R_min are not updated.

Similarly, the summarized information generator 18 executes steps S45 to S56 for all the blocks within the encrypted area 34. Then, a block identified with the finally obtained block index K[0] is selected as the block 34a illustrated in FIG. 9. Additionally, the summarized information generator 18 selects four other blocks from the encrypted area 34. As a result, the five blocks for the summarized information of the encrypted area 34 are selected.

As described above, the encryption device 10 according to the embodiment generates summarized information for each encrypted area, and transmits the generated information to the key management server 20. Then, the key management server 20 registers the summarized information received from the encryption device 10 to the key management DB 29 by making an association with a management number for identifying the encrypted image. At this time, the key management DB 29 stores decryption restriction information and a decryption key along with the summarized information.

<Decryption System>

Figure 11:
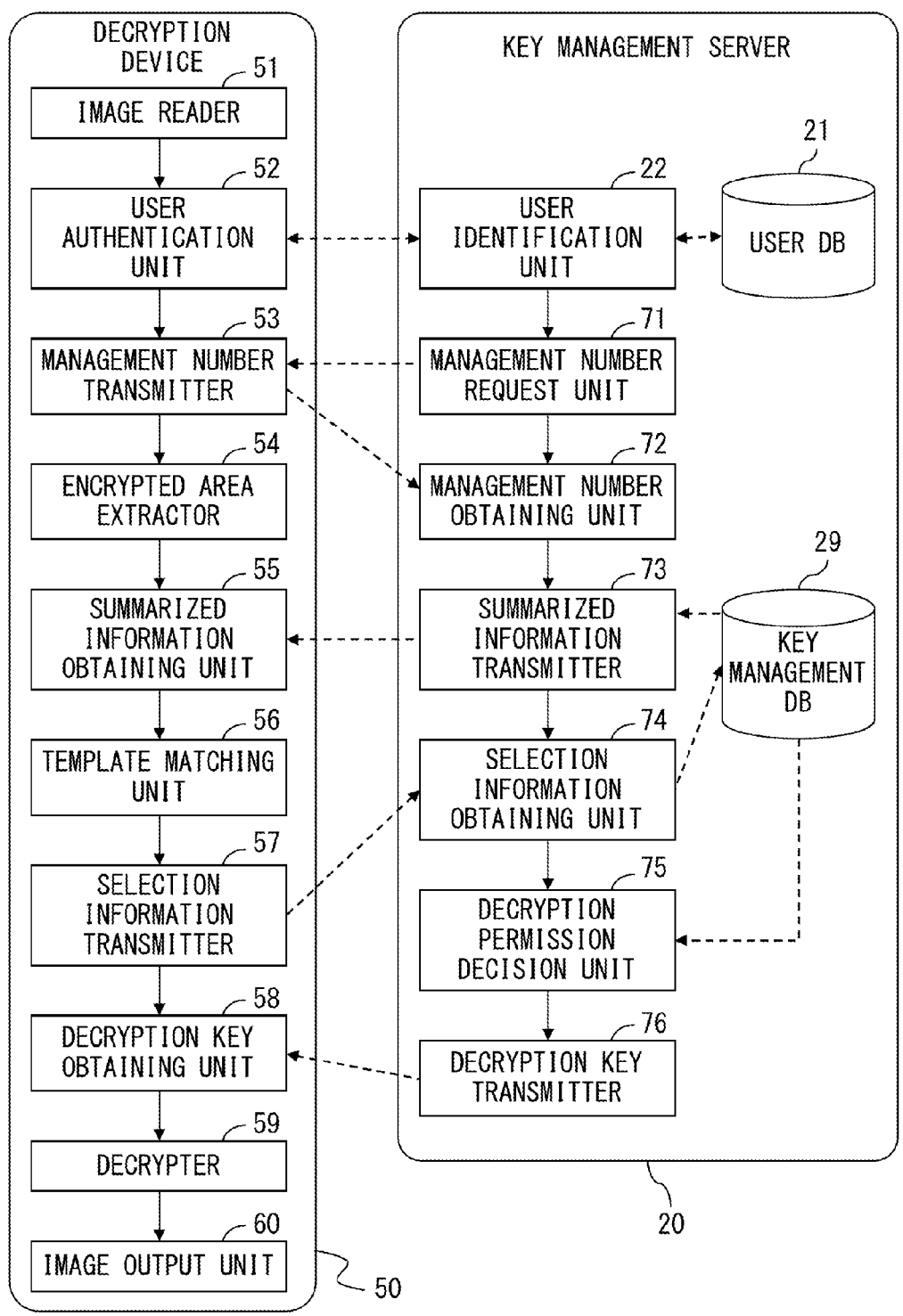
FIG. 11 illustrates a configuration of a decryption system according to the embodiment.

FIG. 11 illustrates a configuration of a decryption system according to the embodiment. The decryption system according to the embodiment includes a decryption device 50 and a key management server 20. The key management server 20 is equivalent to the key management server that is used in the encryption system described with reference to FIGS. 2 to 10. The decryption device 50 can access the key management server 20, for example, via a communication line. The communication line may be, but not particularly limited to, for example, a LAN, a public network or the like. In addition, the communication line may be implemented with a wireless link or a wired link.

The decryption device 50 includes an image reader 51, a user authentication unit 52, a management number transmitter 53, an encrypted area extractor 54, a summarized information obtaining unit 55, a template matching unit 56, a selection information transmitter 57, a decryption key obtaining unit 58, a decryptor 59, and an image output unit 60. The key management server 20 includes a user database (user DB) 21, a user identification unit 22, a key management database (key management DB) 29, a management number request unit 71, a management number obtaining unit 72, a summarized information transmitter 73, a selection information obtaining unit 74, a decryption permission decision unit 75, and a decryption key transmitter 76. The key management server 20 further includes the management number assignment unit 23, the restriction information obtaining unit 24, the encryption key generator 25, the decryption key generator 26, the summarized information obtaining unit 27, and the decryption-related information registration unit 28, which are illustrated in FIG. 2 but not illustrated in FIG. 11.

The image reader 51 reads an image that a user attempts to decrypt. This image is, for example, an encrypted image generated by the encryption device 10 illustrated in FIG. 2. The encrypted image is, for example, printed on a paper medium. In this case, for example, a user obtains image data by photographing the encrypted image with a digital camera. Then, the image reader 51 reads the image data. In the following description, the encrypted image read by the image reader 51 is sometimes referred to as an input image or a target decrypted image.

The user authentication unit 52 authenticates the user who attempts to decrypt the input image. Operations of the user authentication unit 52 are substantially identical to the user authentication unit 12 included in the encryption device 10.

The management number transmitter 53 transmits a management number added to the input image to the key management server 20. The management number is identification information for identifying each encrypted image (namely, a target decrypted image), and generated by the key management server 20 in the encryption process. If the management number is buried in an encrypted image, the management number transmitter 53 obtains the management number from the encrypted image. Alternatively, when the management number is notified to a user without being buried in the encrypted image, the management number transmitter 53 recognizes the management number based on an input from the user.

The encrypted area extractor 54 extracts an encrypted area (namely, a target encrypted area) specified by a user from among one or a plurality of encrypted areas included in the encrypted image. In this example, markers for detecting an area are attached to each encrypted area. Namely, when the encryption device 10 generates the encrypted area 35, the encryption device 10 attaches the markers 36 to an encrypted area 35 as illustrated in FIG. 12. Each of the markers 36 is formed at a corner of the encrypted area 35 as illustrated in FIG. 12A. Alternatively, more markers 36 may be formed for one encrypted area as illustrated in FIG. 12B. The markers 36 respectively have a specified shape and size, and also have a specified image pattern. The encrypted area extractor 54 detects the encrypted area 35 from the encrypted image by detecting the markers 36 in the encrypted image. In the following description, each encrypted area in the input image or an encrypted area extracted by the encrypted area extractor 54 is sometimes referred to as a target encrypted area or a decryption target area.

The summarized information obtaining unit 55 obtains summarized information transmitted from the key management server 20. The key management server 20 transmits summarized information corresponding to a management number received from the decryption device 50 to the decryption device 50. Namely, the summarized information obtaining unit 55 obtains summarized information corresponding to an input image from the key management server 20.

The template matching unit 56 performs template matching between an image of the encrypted area extracted by the encrypted area extractor 54 and the summarized information obtained by the summarized information obtaining unit 55. Then, the template matching unit 56 selects decryption-related information for decrypting the encrypted area extracted by the encrypted area extractor 54 based on a result of the matching. The selection information transmitter 57 transmits selection information that indicates the decryption-related information selected by the template matching unit 56 to the key management server 20.

The decryption key obtaining unit 58 receives a decryption key transmitted from the key management server 20. The decryptor 59 decrypts the encrypted area extracted by the encrypted area extractor 54 with the use of the decryption key received by the decryption key obtaining unit 58.

The template matching unit 56 is an example of a matching unit. Moreover, the decryption key obtaining unit 58 is an example of an obtaining unit. Alternatively, the obtaining unit may be implemented with the selection information transmitter 57 and the decryption key obtaining unit 58.

The image output unit 60 outputs an image (namely, a decrypted image) where an encrypted area is decrypted by the decryptor 59. The image output unit 60 is, but not particularly limited to, for example, a display device for displaying image data, or an interface device for making a connection to the display device. Alternatively, the image output unit 60 is a printer for printing image data on paper or the like, or an interface device for making a connection to the printer.

The management number request unit 71 issues a request of a management number for identifying a decryption target image to the decryption device 50. Then, the decryption device 50 transmits the management number to the key management server 20 in response to this request. The management number obtaining unit 72 obtains the management number transmitted from the decryption device 50.

The summarized information transmitter 73 extracts summarized information corresponding to the management number obtained by the management number obtaining unit 72 from the key management DB 29, and transmits the extracted information to the decryption device 50. If one encrypted image includes a plurality of encrypted areas, summarized information is generated for each of the encrypted areas and registered to the key management DB 29. In this case, the summarized information transmitter 73 transmits, to the decryption device 50, all pieces of the summarized information that are registered to the key management DB 29 by making an association with the management number received from the decryption device 50.

The selection information obtaining unit 74 obtains selection information transmitted from the decryption device 50. This selection information identifies decryption-related information for decrypting a decryption target area in the decryption device 50. Then, the selection information obtaining unit 74 extracts decryption restriction information included in the decryption-related information corresponding to the selection information from the key management DB 29, and passes the extracted information to the decryption permission decision unit 75.

The decryption permission decision unit 75 references the decryption restriction information obtained from the key management DB 29, and determines whether or not to permit decryption of the decryption target area. When the decryption of the target area is permitted, the decryption key transmitter 76 transmits a decryption key included in the decryption-related information identified by the selection information to the decryption device 50. As a result, the decryption device 50 decrypts the target encrypted area (namely, the area to be decrypted) within the encrypted image.

Figure 13:
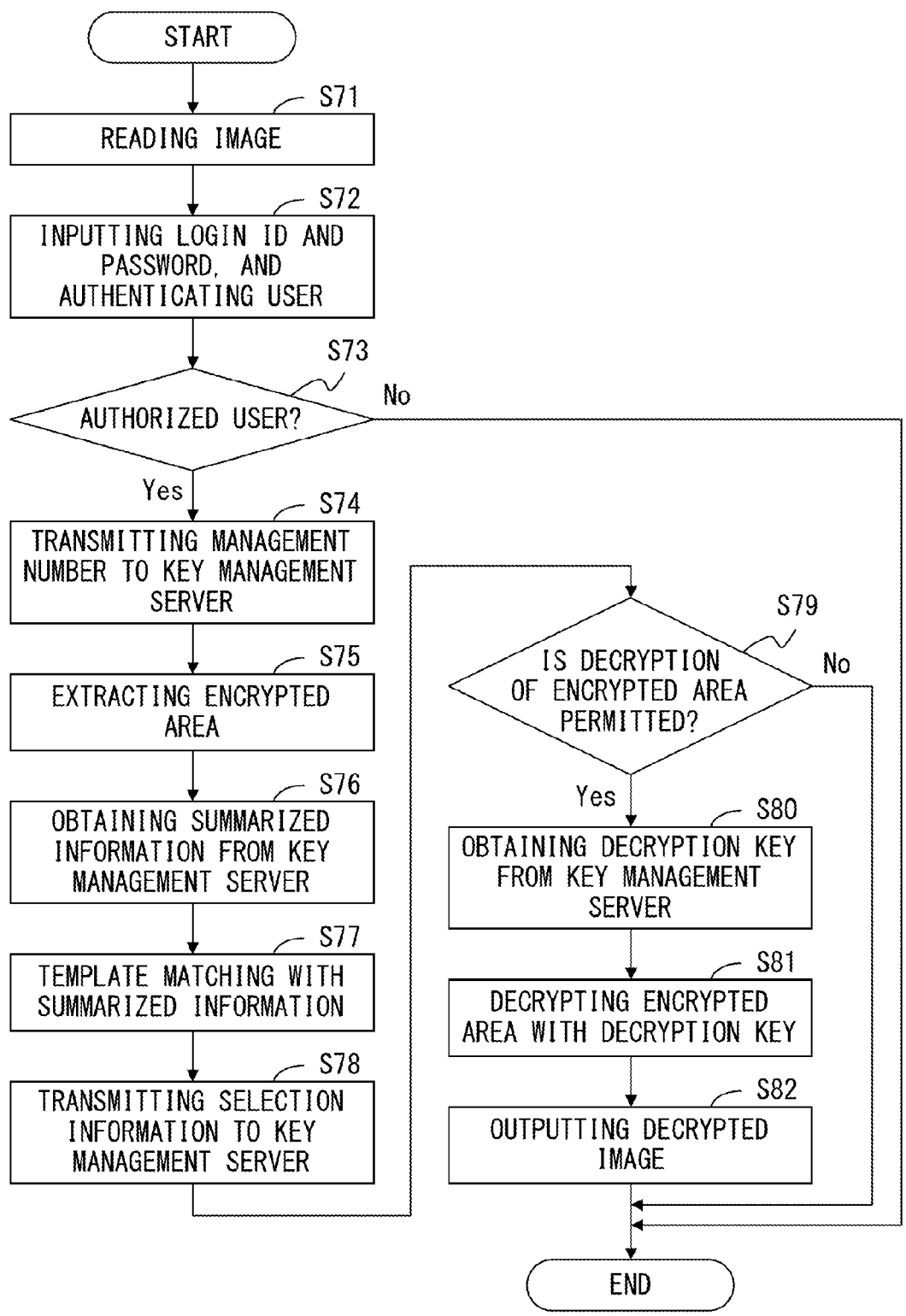
FIG. 13 is a flowchart illustrating a process of the decryption system according to the embodiment.

FIG. 13 is a flowchart illustrating the process of the decryption system according to the embodiment. The process represented by this flowchart is started, for example, when an encrypted image is given to the decryption device 50.

In step S71, the image reader 51 reads the encrypted image. This encrypted image is generated, for example, by the encryption device 10 illustrated in FIG. 2. The input image to the decryption device 50 may be part of an encrypted image generated by the encryption device 10. Moreover, the input image may be image data obtained by enlarging or reducing the encrypted image generated by the encryption device 10.

In steps S72 and S73, the user authentication unit 52 requests the key management server 20 to authenticate a user by transmitting a login ID and a password, which have been input by the user, to the key management server 20. The user identification unit 22 determines whether or not a pair of the user ID and the password, which have been received from the user authentication unit 52, is registered to the user DB 21. Then, the user identification unit 22 notifies the user authentication unit 52 of a result of the authentication. When the user has been successfully authenticated, the management number request unit 71 issues a request of a management number for identifying the encrypted image to the decryption device 50. When the user has been authenticated by the key management server 20 and the request of the management number has been received from the key management server 20, the decryption device 50 executes a process of steps S74 to S82. Alternatively, when the user has been unsuccessfully authenticated, the decryption system terminates the process.

In step S74, the management number transmitter 53 transmits a management number added to the input encrypted image to the key management server 20. At this time, the management number transmitter 53 obtains the management number from the input encrypted image or the user as described above. Then, the management number obtaining unit 72 receives the management number transmitted from the management number transmitter 53.

In step S75, the encrypted area extractor 54 extracts a target encrypted area (namely, an area to be decrypted) from the encrypted image. At this time, the encrypted area extractor 54 extracts the target encrypted area, for example, by detecting markers 36 attached to corners of the encrypted area as described above with reference to FIG. 12. In this case, the markers 36 respectively have a specified shape and size, and also have a specified image pattern.

The encrypted image input to the decryption device 50 is obtained, for example, by photographing the encrypted image generated by the encryption device 10 with a digital camera. In this case, an enlargement, a reduction, a rotation or the like may occur between the original encrypted image and the input encrypted image to the decryption device 50. However, the encrypted area extractor 54 can detect the enlargement, the reduction, the rotation, or the like that occurs between the original encrypted image and the input encrypted image by making a comparison between the size or image pattern of the markers 36 detected in the input image and the specified size or image pattern of the markers 36.

In step S76, the summarized information transmitter 73 extracts, from the key management DB 29, summarized information corresponding to the management number transmitted from the decryption device 50, and transmits the extracted information to the decryption device 50. Here, the management number identifies each encrypted image generated by the encryption device 10. Moreover, when one encrypted image includes a plurality of encrypted areas, summarized information is generated for each of the encrypted areas and registered to the key management DB 29. Accordingly, the same management number is added to the summarized information corresponding to a plurality of encrypted areas if one encrypted image includes the plurality of encrypted areas. For instance, in the example illustrated in FIG. 4, the key management DB 29 manages summarized information respectively corresponding to the encrypted areas 31 to 34 with the management number "1996040103".

FIG. 14 is an explanatory view of a process for extracting summarized information from the key management DB 29. In FIG. 14, the summarized information transmitter 73 searches the key management DB 29 based on the management number "19996040103". As a result, summarized information "A1+∇", "A2+☆", "A3+□" and "A4+◇" are extracted from the key management DB 29. A1 to A4 respectively represent the generation rule data described with reference to FIG. 8. Moreover, "∇", "☆", "□", "◇" respectively represent feature data. In this case, the summarized information transmitter 73 transmits all summarized information, which has been extracted based on the management number "1996040103", to the decryption device 50.

In step S77, the template matching unit 56 generates respectively corresponding feature data from the decryption target area based on the generation rule data included in the summarized information received from the key management server 20. Then, the template matching unit 56 performs template matching between the feature data respectively included in the summarized information and the corresponding feature data newly generated.

In step S78, the template matching unit 56 selects summarized information having the highest degree of matching. Then, the template matching unit 56 transmits selection information for identifying the selected summarized information to the key management server 20.

Figure 15:
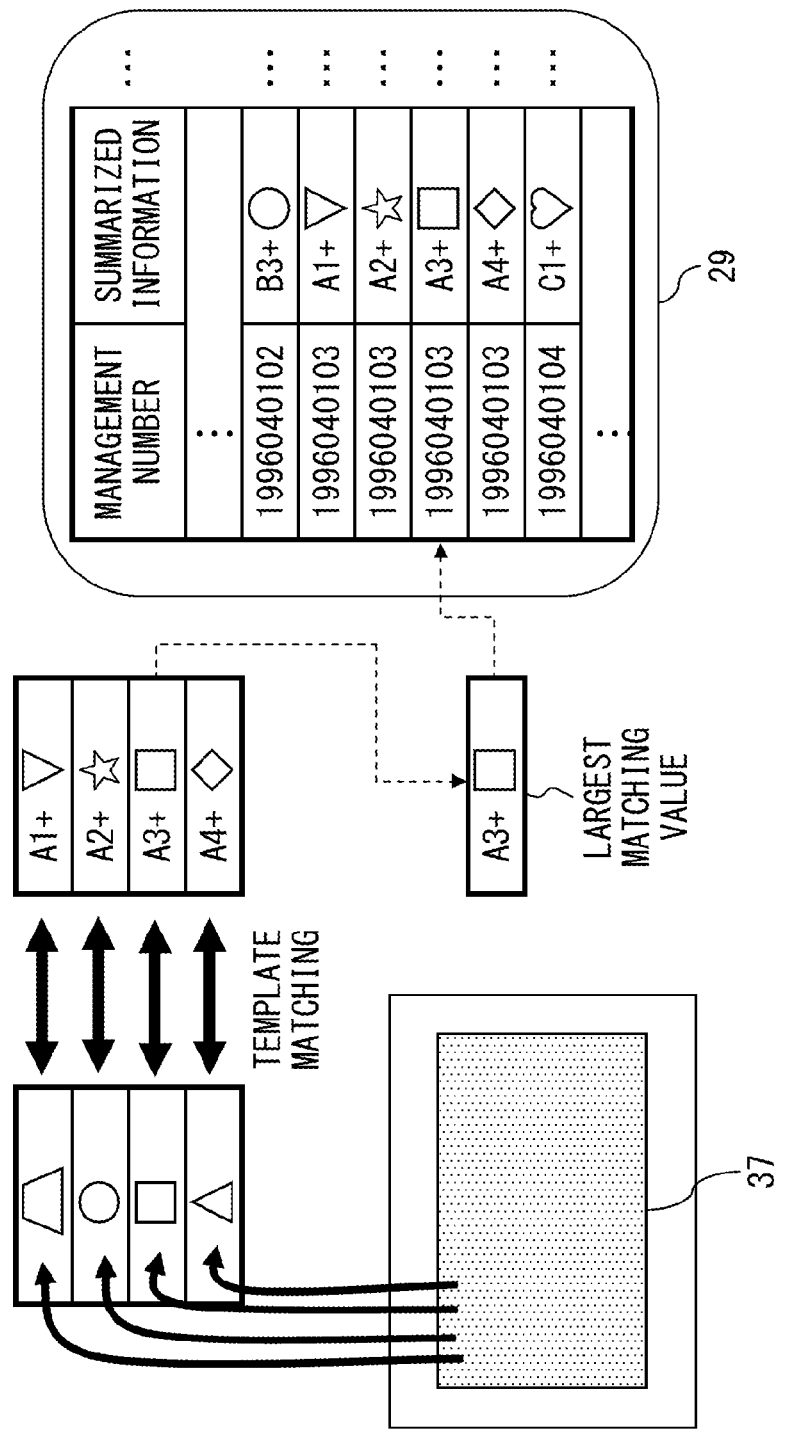
FIG. 15 is an explanatory view of a template matching process.

FIG. 15 is an explanatory view of the template matching process executed in steps S77 and S78. In this example, the decryption device 50 receives the four pieces of summarized information "A1+▽", "A2+☆", "A3+□" and "A4+◇" identified with the management number 1996040103 from the key management server 20. Moreover, the decryption device 50 decrypts an encrypted area 37.

The template matching unit 56 generates feature data from the encrypted area 37 based on the generation rule data A1 included in the first summarized information "A1+▽". Then, the template matching unit 56 calculates a matching value between the feature data generated based on the generation rule data A1 and that included in the first summarized information. Then, the template matching unit 56 generates feature data from the encrypted area 37 based on the generation rule data A2 included in the second summarized information "A2+☆". Next, the template matching unit 56 calculates a matching value between the feature data generated based on the generation rule data A2 and that included in the second summarized information. Additionally, the template matching unit 56 similarly calculates matching values for the third summarized information "A3+□" and the fourth summarized information "A4+◇".

In the above described template matching process, the matching value for the third summarized information is largest. Namely, both the feature data generated based on the generation rule data A3 and that included in the third summarized information are "□". Accordingly, the template matching unit 56 transmits selection information for selecting the third summarized information to the key management server 20. The template matching will be described in detail later.

Turning back to FIG. 13. In step S79, the selection information obtaining unit 74 extracts, from the key management DB 29, decryption-related information corresponding to the selection information received from the decryption device 50. Then, the decryption permission decision unit 75 references decryption restriction information included in the decryption-related information extracted from the key management DB 29, and determines whether or not to permit decryption of the target encrypted area. At this time, the decryption permission decision unit 75 determines, for example, whether or not a decryption right is granted to the user identified by the user identification unit 22. Alternatively, the decryption permission decision unit 75 may verify, for example, whether or not the current date and time is within a decryption-allowed period. If the decryption of the target encrypted area is permitted, the process proceeds to step S80. Alternatively, if the decryption of the target encrypted area is not permitted, the process of the decryption system is terminated.

In step S80, the decryption key transmitter 76 transmits, to the decryption device 50, a decryption key included in the decryption-related information corresponding to the selection information received from the decryption device 50. As a result, the decryption key obtaining unit 58 of the decryption device 50 obtains the decryption key.

In step S81, the decryptor 59 decrypts the target encrypted area (namely, the area to be decrypted) by using the decryption key received from the key management server 20. Then, the image output unit 60 outputs the decrypted image in step S82.

Figure 16:
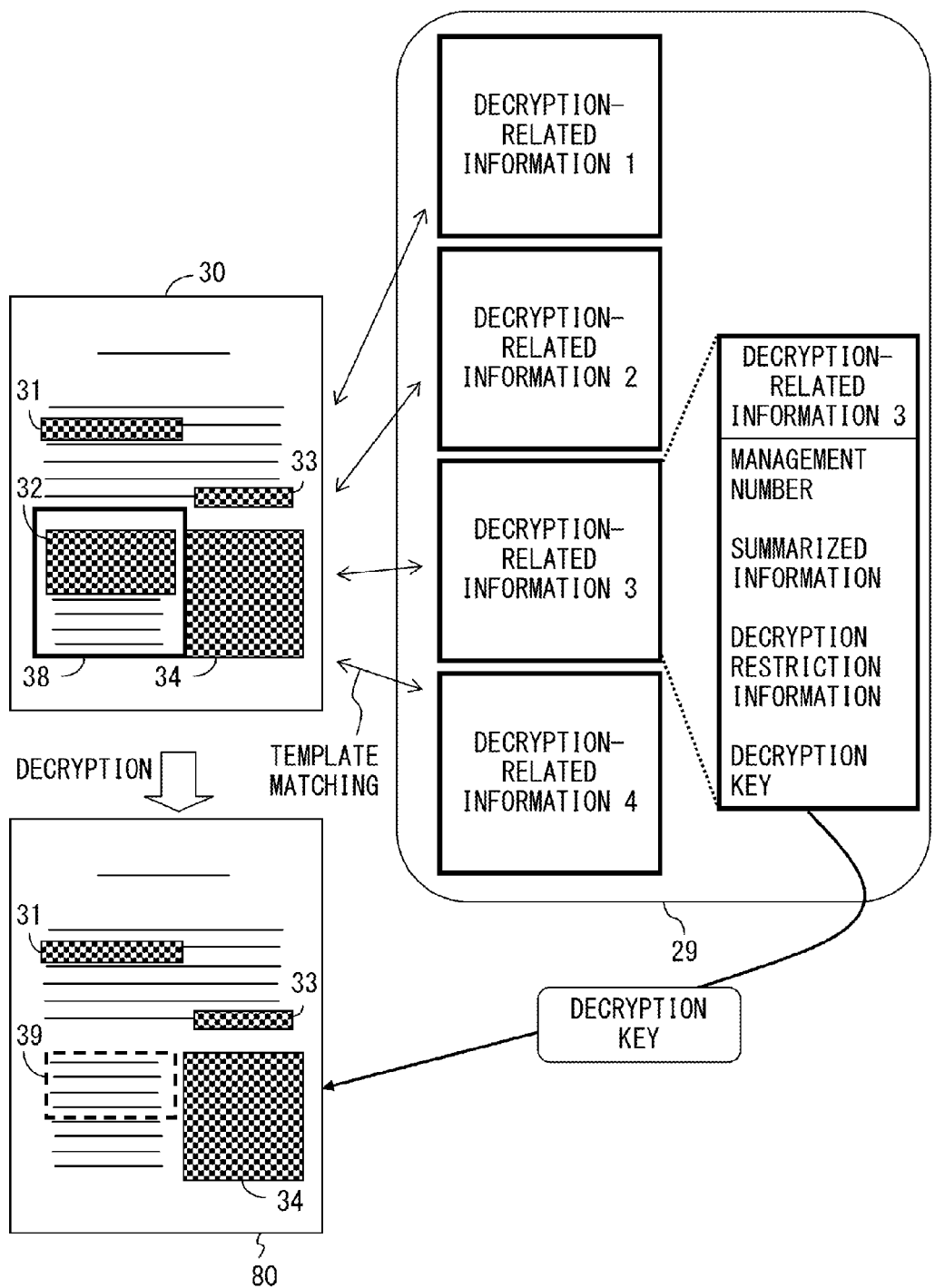
FIG. 16 is an explanatory view of a process for decrypting an encrypted area based on template matching.

FIG. 16 is an explanatory view of the process for decrypting an encrypted area based on the template matching. In this example, a user photographs the encrypted image 30, for example, by using a digital camera. At this time, a photographing range 38 covers the encrypted area 32. However, the photographing range 38 does not necessarily cover the entire area of the encrypted image 30. The decryption device 50 transmits a management number added to the encrypted image 30 to the key management server 20. The key management server 20 transmits, to the decryption device 50, summarized information included in the decryption-related information 1 to 4 corresponding to the received management number.

In the decryption device 50, the template matching unit 56 performs template matching between feature data included in each piece of the summarized information and that generated from the encrypted area 32 based on generation rule data included in corresponding piece of the summarized information by using the procedures described with reference to FIG. 15. As a result, the degree of matching of the summarized information included in the decryption-related information 3 is highest in this example. Therefore, the key management server 20 transmits a decryption key included in the decryption-related information 3 to the decryption device 50.

The decryption device 50 decrypts the encrypted area 32 by using the decryption key received from the key management server 20, and generates a decrypted area 39. Namely, the decryption device 50 outputs a decrypted image including the decrypted area 39.

The template matching is described in detail with reference to FIG. 17. In the example illustrated in FIG. 17, the decryption device 50 decrypts the encrypted area 32 from the encrypted image 30 illustrated in FIG. 4. Here, the key management server 20 stores the summarized information respectively corresponding to the encrypted areas 31 to 34. This example assumes that the summarized information 1 and the summarized information 4 are generated respectively for the encrypted area 32 and the encrypted area 33. The summarized information 1 includes the image information 32a to 32e as feature data, whereas the summarized information 4 includes the image information 33a to 33e as feature data.

The template matching unit 56 obtains the summarized information 1 to 4 from the key management server 20. Then, the template matching unit 56 extracts five blocks from the encrypted area 32 based on position information of the summarized information 1. For example, the template matching unit 56 extracts a block x1a based on the position information (8,8), and further extracts a block x1b based on the position information (72,8). Thus, five blocks x1a to x1e are extracted. Then, the template matching unit 56 performs template matching between each of the image information 32a to 32e included in the summarized information 1 and each of the image information of the blocks x1a to x1e extracted from the encrypted area 32, and calculates a matching value. The matching value is equivalent to, for example, a total sum of a correlation between the image 32a and the image x1a, a correlation between the image 32b and the image x1b, a correlation between the image 32c and the image x1c, a correlation between the image 32d and the image x1d, and a correlation between the image 32e and the image x1e.

Here, the image information 32a, 32b . . . in the summarized information 1 are feature data of the blocks extracted based on the positions (8,8), (72,8) . . . of the encrypted area 32 in the encryption process. Accordingly, the correlations between the feature data x1a, x1b . . . of the blocks extracted from the encrypted area 32 based on the position information (8,8), (72,8) . . . in the summarized information 1 and the image information 32a, 32b . . . of the summarized information 1 are high in the decryption process, so that the matching value becomes large.

The template matching unit 56 performs similar template matching for the summarized information 2 to 4. In FIG. 17, the template matching process for the summarized information 4 is illustrated. Namely, the template matching unit 56 calculates a matching value by performing the template matching between the image information 33a to 33e included in the summarized information 4 and the image information of the blocks x4a to x4e extracted from the encrypted area 32.

Here, the image information 33a, 33b . . . in the summarized information 4 are feature data of the blocks extracted based on positions (48,8), (48,24) . . . of not the encrypted area 32 but the encrypted area 33 in the encryption process. Accordingly, a possibility that a matching value between the feature data x4a, x4b . . . of the blocks extracted from the encrypted area 32 based on the position information (48,8), (48,24) . . . in the summarized information 4 and the image information 33a, 33b . . . in the summarized information 4 becomes large is low in the decryption process. Also a possibility that each of matching values for the other summarized information 2 and 3 becomes large is low.

Accordingly, the decryption device 50 calculates the respectively matching values with respect to the summarized information 1 to 4, and selects summarized information having the largest matching value. As a result, summarized information that corresponds to the encrypted area 32 with the highest probability is selected from among the summarized information 1 to 4. In this example, the summarized information 1 is selected. Then, the decryption device 50 obtains a decryption key corresponding to the summarized information 1 from the key management server 20, and decrypts the encrypted area 32 with the decryption key.

Note that each encrypted area sometimes has a geometric distortion (such as an enlargement, a reduction, a rotation, or the like), for example, due to a reason why an encrypted image is photographed with a digital camera. Accordingly, it is preferable that the decryption device 50 has a function of detecting the distortion and correcting position information included in summarized information. This correction function is implemented, for example, by using the markers 36 illustrated in FIG. 12. In this case, the decryption device 50 estimates a geometric distortion of an encrypted area based on information such as a change of a size, an angle, a shape, or the like of the markers 36 detected from an input image, and corrects position information within summarized information according to a result of the estimation. Assume that the size of the markers 36 detected from an input image to the decryption device 50 is 50 percent of that of the markers 36 attached to an encrypted area by the encryption device 10. For example, if position information within the summarized information are (8,8), (72,8) . . . in this case, the template matching unit 56 respectively corrects the position information to (4,4), (36,4) . . . . Then, the template matching unit 56 extracts blocks from the encrypted area based on the corrected position information. Alternatively, the template matching unit 56 may correct a target encrypted image according to a result of the above describe estimation of the geometric distortion.

Figure 18:
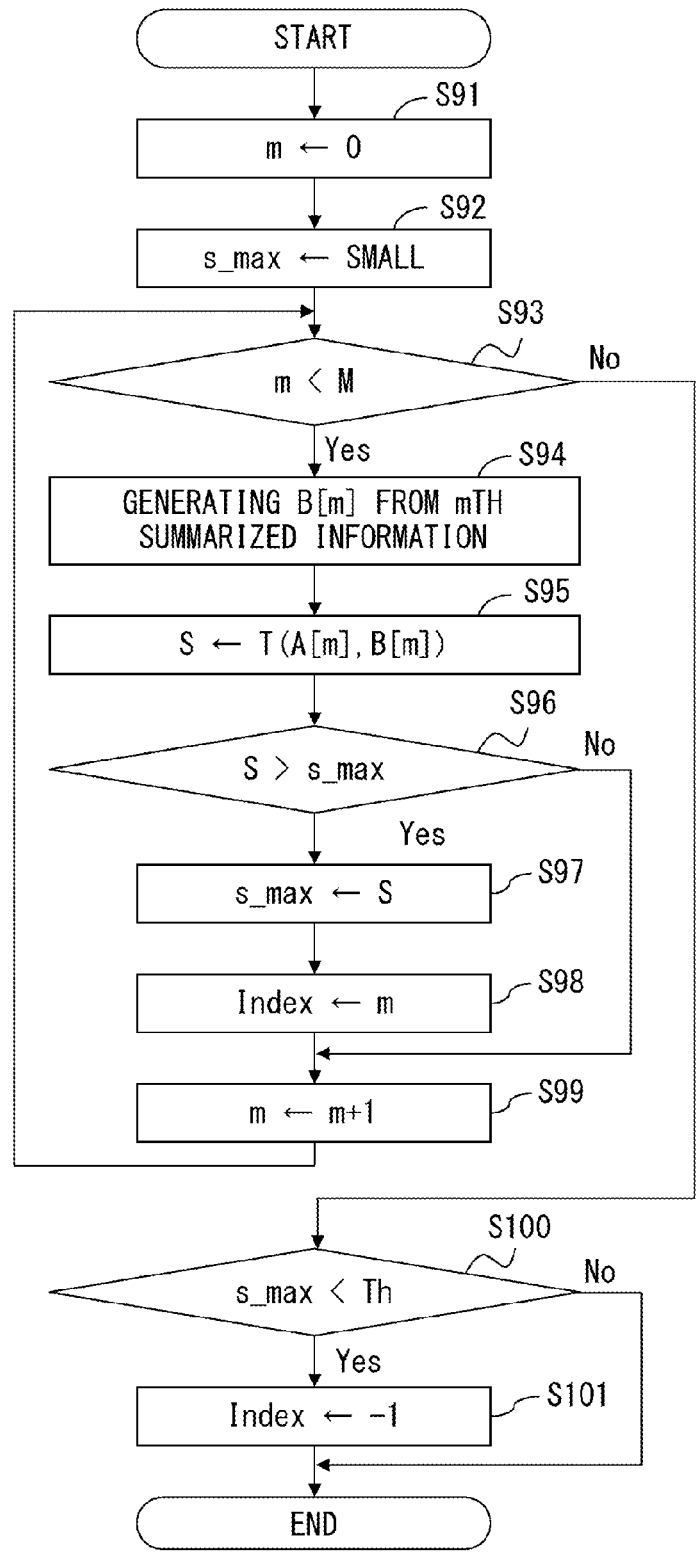
FIG. 18 is a flowchart illustrating the template matching process.

FIG. 18 is a flowchart illustrating the template matching process. This flowchart is executed when the template matching unit 56 obtains summarized information from the key management server 20. In the description of the flowchart illustrated in FIG. 18, the following parameters and variables are used.
M: Number of pieces of summarized information registered for a management number for identifying an decryption target image
m: Variable for respectively identifying M sets of summarized information s_max: Variable for calculating a maximum value of matching values
SMALL: A minimum value that can be taken by a matching value
A[m]: Image information included in mth summarized information
B[m]: Image information of a block extracted from an encrypted area based on position information included in the mth summarized information
Index: Variable that represents summarized information having the maximum matching value In step S91, the template matching unit 56 initializes the variable m to 0. In step S92, the template matching unit 56 initializes the variable s_max. At this time, a specified minimum value "small" is assigned to the variable s_max. The minimum value "small" may be, for example, 0. The template matching unit 56 executes steps S93 to S99 for each of the summarized information as follows.

In step S93, the template matching unit 56 determines whether or not the variable m has reached M. If m is smaller than M, the template matching unit 56 determines that summarized information yet to be processed is left, and executes steps S94 to S99. If m is equal to M, the process proceeds to step S100.

In step S94, the template matching unit 56 generates B [m] from an encrypted area based on the mth summarized information. In step S95, the template matching unit 56 calculates a matching value T (A[m],B[m]) between A[m] and B[m], and obtains the calculated value as data S. The matching value T is calculated, for example, with the following expression (7).

$$T(A[m], B[m]) = \frac{1}{N}\sum_{n=0}^{N-1} R(An[m], Bn[m]) \quad \text{(Expression 7)}$$

N represents the number of blocks extracted from each encrypted area in order to be used as summarized information. An[m] represents image information of the nth block included in the mth summarized information. Bn[m] represents image information of a block extracted from the encrypted area based on position information of the nth block included in the mth summarized information. An[m] and Bn[m] are represented with a vector similarly to the above described expression (2). R(An[m],Bn[m]) represents a correlation between An[m] and Bn[m], and is calculated similarly to the above described expressions (4) and (5).

In step S96, the template matching unit 56 makes a comparison between the data S that represents the newly calculated matching value and the earlier calculated maximum value s_max of matching values. When S is larger than s_max at this time, the template matching unit 56 assigns the data S to the maximum value s_max in step S97. Then, the template matching unit 56 assigns m to the variable "Index" in step S98. "Index=m" represents that the matching value of the mth summarized information is maximum. When S is not larger than s_max, steps S97 and S98 are skipped. Namely, the maximum value s_max is not updated. Then, the template matching unit 56 increments the variable m by 1 in step S99.

When the process of steps S93 to S99 is performed for all the pieces of summarized information, the process proceeds to step S100. In step S100, the template matching unit 56 makes a comparison between the maximum value s_max of the matching values obtained in steps S93 to S99 and the threshold value Th. When s_max is equal to or larger than Th, the template matching unit 56 determines that a possibility that correct summarized information has been identified with the template matching is high, and outputs "m" stored as the variable "Index". Alternatively, when s_max is smaller than Th, the template matching unit 56 determines that the possibility that the correct summarized information has been identified with the template matching is low, and outputs "−1" as the variable "Index". Note that "Index=−1" represents that summarized information has been unsuccessfully identified with the template matching.

"m (excluding −1)" decided by the flowchart illustrated in FIG. 18 represents selection information for identifying summarized information corresponding to a target encrypted area. Accordingly, the selection information transmitter 57 transmits this calculation result to the key management server 20 as selection information.

<Effects According to the Embodiment>

As described above, the encryption device according to the embodiment generates identification information (summarized information in the embodiment) for identifying an encrypted area based on an image of the encrypted area when the encryption device generates an encrypted image by encrypting a partial area within an input image. The key management server manages a decryption key for decrypting the encrypted area by making an association with the identification information.

The decryption device performs template matching between image information obtained from identification information and that obtained from a target encrypted area when the decryption device decrypts the target encrypted area. Then, the decryption device obtains a decryption key according to a result of the matching, and decrypts the target encrypted area using the decryption key.

Accordingly, in the encryption/decryption system according to the embodiment, the decryption device can obtain a decryption key of a target encrypted area without detecting a position of the target encrypted area even if an encrypted image includes a plurality of encrypted areas. For example, even if the entire encrypted image is not obtained when a user photographs a target encrypted area with a digital camera and inputs image data of the photographed area to the decryption device, the decryption device can recognize the target encrypted area among a plurality of encrypted areas by image processing. Namely, the decryption device according to the embodiment can identify a target encrypted area with high accuracy without detecting a position of the target encrypted area within an encrypted image. As a result, the decryption device can properly decrypt a desired encrypted area.

<Hardware Configuration>

Figure 19:
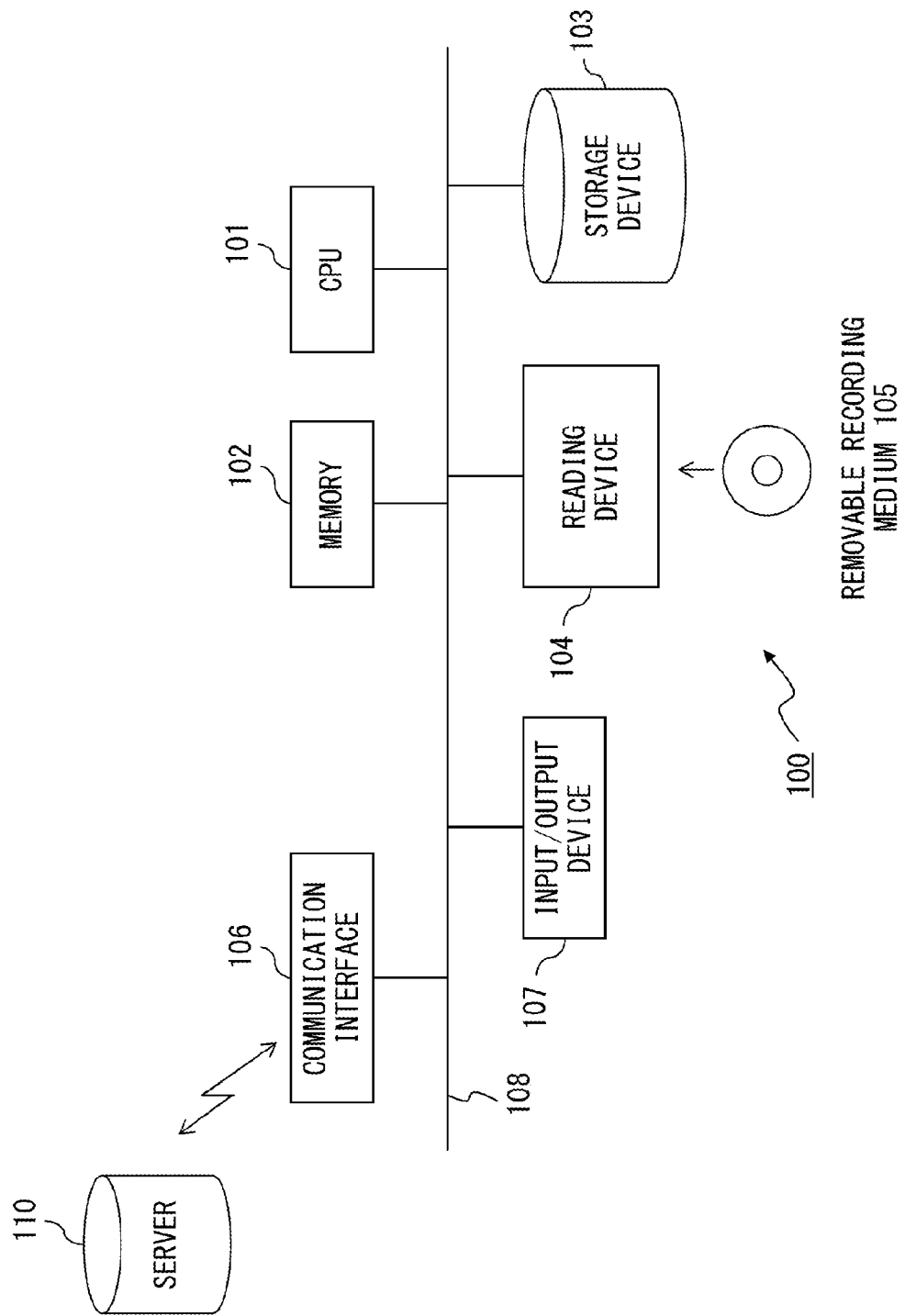
FIG. 19 illustrates an example of a hardware configuration of an encryption device, a decryption device, and a key management server.

FIG. 19 illustrates a hardware configuration of a computer system 100 for implementing the encryption device 10, the decryption device 50, and the key management server 20. The computer system 100 includes a CPU 101, a memory 102, a storage device 103, a reading device 104, a communication interface 106, and an input/output device 107 as illustrated in FIG. 19. The CPU 101, the memory 102, the storage device 103, the reading device 104, the communication interface 106, and the input/output device 107 are interconnected, for example, via a bus 108.

The CPU 101 provides the functions of the encryption device 10, the decryption device 50, and the key management server 20 according to the embodiment by executing a program that describes the procedures of the above described flowcharts with the use of the memory 102. If the computer system 100 operates as the encryption device 10, the CPU 101 executes a program that describes some or all of the functions of the components 11 to 19 illustrated in FIG. 2. Alternatively, if the computer system 100 operates as the decryption device 50, the CPU 101 executes a program that describes some or all of the functions of the components 51 to 60 illustrated in FIG. 11. Further alternatively, if the computer system 100 operates as the key management server 20, the CPU 101 executes a program that describes some or all of the functions of the components 22 to 28 illustrated in FIG. 2 and those of the components 71 to 76 illustrated in FIG. 11.

The memory 102 is, for example, a semiconductor memory, and configured to include a RAM area and a ROM area.

The storage device 103 is, for example, a hard disk, and stores a program related to the encryption/decryption of the embodiment. The storage device 103 may be a semiconductor memory such as a flash memory or the like. Alternatively, the storage device 103 may be an external recording device. If the computer system 100 operates as the key management server 20, the user DB 21 and the key management DB 29 are provided, for example, in the storage device 103.

The reading device 104 accesses a removable recording medium 105 according to an instruction of the CPU 101. The removable recording medium 105 is implemented, for example, with a semiconductor device (a USB memory or the like), a medium to/from which information is input/output with a magnetic action, a medium (a CD-ROM, a DVD or the like) to/from which information is input/output with an optical action, or other media. The communication interface 106 transmits/receives data via a network according to an instruction of the CPU 101. The input/output device 107 is equivalent to, for example, a device that accepts an instruction from a user, a device that reads image data, a device that outputs an image, or the like.

The program related to the encryption/decryption of the embodiment is provided to the computer system 100, for example, in the following forms.

(1) Preinstalled in the storage device 103.
(2) Provided by the removable recording medium 105.
(3) Downloaded from a program server 110.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An image encryption system, comprising:
   a processor; and
   a memory, wherein
   the processor generates an encrypted image including an encrypted area by encrypting a partial area of an input image,
   the processor selects a plurality of blocks based on a degree of complexity of an image of each block within the encrypted area,
   the processor generates identification information for identifying the encrypted area by using images of the plurality of selected blocks, and
   the processor associates the identification information and a decryption key for decrypting the encrypted area and registers the identification information and the decryption key in the memory.

2. The image encryption system according to claim 1, wherein
when the processor generates a plurality of encrypted areas, the processor generates a plurality of sets of identification information so that correlations among the plurality of sets of identification information corresponding to the plurality of encrypted areas become low.

3. An image encryption system, comprising:
a processor; and
a memory, wherein
the processor generates an encrypted image including an encrypted area by encrypting a partial area of an input image,
the processor selects a plurality of blocks within the encrypted area, and generates the identification information for identifying the encrypted area by using images of the plurality of selected blocks,
the processor associates the identification information and a decryption key for decrypting the encrypted area and registers the identification information and the decryption key in the memory, wherein
the identification information includes rule data that represents a rule for selecting each of the plurality of blocks, and image data of each of the plurality of blocks.

4. The image encryption system according to claim 3, wherein
when the processor generates a plurality of encrypted areas, the processor generates a plurality of sets of identification information so that correlations among the plurality of sets of identification information corresponding to the plurality of encrypted areas become low.

5. An image encryption method, comprising:
generating, using a processor, an encrypted image including an encrypted area by encrypting a partial area of an input image;
selecting, using a processor, a plurality of blocks based on a degree of complexity of an image of each block within the encrypted area;
generating, using the processor, identification information for identifying the encrypted area by using images of the plurality of selected blocks; and
associating, using the processor, the identification information and a decryption key for decrypting the encrypted area and registering the identification information and the decryption key in a memory.

6. An image encryption device comprising a processor, wherein
the processor generates an encrypted image including an encrypted area by encrypting a partial area of an input image,
the processor selects a plurality of blocks based on a degree of complexity of an image of each block within the encrypted area,
the processor generates identification information for identifying the encrypted area by using images of the plurality of selected blocks, and
the processor transmits the identification information to a key management server so that the identification information is associated with a decryption key for decrypting the encrypted area and registered in the key management server.

7. An image decryption system, comprising:
a processor; and
a memory configured to store identification information generated based on an image of each of a part of a plurality of encrypted areas and a decryption key for decrypting each of the plurality of encrypted areas, the identification information and the decryption key being associated with each other, for each of the plurality of encrypted areas of an encrypted image including the plurality of encrypted areas, wherein
the processor extracts a target encrypted area from among the plurality of encrypted areas of the encrypted image,
the processor executes a matching process between the target encrypted area and each of the identification information stored in the memory,
the processor obtains, from the memory, a decryption key corresponding to identification information by which highest matching with the target encrypted area is obtained, and
the processor decrypts the target encrypted area by using the obtained decryption key obtained, wherein
the identification information includes image data of each of a plurality of blocks selected from the encrypted areas, and rule data that represents a rule for selecting each of the plurality of blocks, and
the processor performs matching between images of the plurality of blocks selected from the target encrypted area based on the rule data included in the identification information and the image data included in the identification information.

8. An image decryption method for decrypting an encrypted image by accessing a key management server that stores identification information generated based on an image of each of a part of a plurality of encrypted areas and a decryption key for decrypting each of the plurality of encrypted areas, the identification information and the decryption key being associated with each other, for each of the plurality of encrypted areas of the encrypted image including the plurality of encrypted areas, the image decryption method comprising:
extracting, using a processor, a target encrypted area from among the plurality of encrypted areas of the encrypted image;
performing, using the processor, a matching process between the target encrypted area and each of the identification information stored to the key management server;
obtaining, using the processor, from the key management server, a decryption key corresponding to identification information by which highest matching with the target encrypted area is obtained; and
decrypting, using the processor, the target encrypted area by using the decryption key, wherein
the identification information includes image data of each of a plurality of blocks selected from the encrypted areas, and rule data that represents a rule for selecting each of the plurality of blocks, and
the processor performs matching between images of the plurality of blocks selected from the target encrypted area based on the rule data included in the identification information and the image data included in the identification information.

9. An image decryption device for decrypting an encrypted image by accessing a key management server that stores identification information generated based on an image of each of a part of a plurality of encrypted areas and a decryption key for decrypting each of the plurality of encrypted areas, the identification information and the decryption key being associated with each other, for each of the plurality of encrypted areas of the encrypted image including the plurality of encrypted areas, the image decryption device comprising a processor, wherein the processor extracts a target encrypted area from among the plurality of encrypted areas of the encrypted image, the processor executes a matching process between the target encrypted area and each of the identification information stored in the key management server, the processor obtains, from the key management server, a decryption key corresponding to identification information by which highest matching with the target encrypted area is obtained, and the processor decrypts the target encrypted area by using the obtained decryption key, wherein the identification information includes image data of each of a plurality of blocks selected from the encrypted areas, and rule data that represents a rule for selecting each of the plurality of blocks, and the processor performs matching between images of the plurality of blocks selected from the target encrypted area based on the rule data included in the identification information and the image data included in the identification information.

* * * * *